(12) United States Patent
Ghela

(10) Patent No.: US 6,619,283 B2
(45) Date of Patent: *Sep. 16, 2003

(54) SOLAR COLLECTOR PIPE

(76) Inventor: Manu Ghela, 537 S. Country Club Dr., Mesa, AZ (US) 85210

( * ) Notice: Subject to any disclaimer, the term of this patent is extended or adjusted under 35 U.S.C. 154(b) by 0 days.

This patent is subject to a terminal disclaimer.

(21) Appl. No.: 10/086,164

(22) Filed: Feb. 27, 2002

(65) Prior Publication Data

US 2003/0047181 A1 Mar. 13, 2003

Related U.S. Application Data

(63) Continuation-in-part of application No. 09/952,597, filed on Sep. 11, 2001.

(51) Int. Cl.[7] .................................................. F24J 2/10
(52) U.S. Cl. ........................ 126/692; 126/674; 126/651; 126/658; 126/662; 126/693
(58) Field of Search ................................ 126/692–695, 126/659–675

(56) References Cited

U.S. PATENT DOCUMENTS

| | | | | |
|---|---|---|---|---|
| 1,855,815 A | * | 4/1932 | Abbot | |
| 3,990,430 A | | 11/1976 | Robertson | |
| 4,059,093 A | * | 11/1977 | Knowles et al. | 126/636 |
| 4,092,979 A | * | 6/1978 | Kotlarz | |
| 4,122,831 A | | 10/1978 | Mahdjuri | |
| 4,134,392 A | * | 1/1979 | Livermore et al. | 126/657 |
| 4,142,514 A | * | 3/1979 | Newton | 126/677 |
| 4,198,955 A | | 4/1980 | Dorbeck | |
| 4,206,747 A | * | 6/1980 | Niedermeyer | 126/651 |
| 4,284,068 A | * | 8/1981 | Gunderson | |
| 4,311,132 A | | 1/1982 | van Kuijk | |
| 4,340,035 A | * | 7/1982 | Begun | 126/676 |
| 4,440,154 A | | 4/1984 | Bellows | |
| 4,515,149 A | * | 5/1985 | Sgroi et al. | |

FOREIGN PATENT DOCUMENTS

| | | | | |
|---|---|---|---|---|
| DE | 41 23 096 | * | 1/1993 | 126/692 |
| DE | 43 35 914 | * | 4/1994 | 126/692 |
| DE | 198 34 089 | * | 3/1999 | 126/692 |
| DE | 198 21 137 | * | 11/1999 | 126/692 |
| EP | 0 743 495 | * | 11/1996 | |
| GB | 1515935 | * | 6/1978 | 126/652 |
| GB | 2 079 445 | * | 1/1982 | 126/692 |
| JP | 56-80654 | * | 2/1981 | 126/692 |
| JP | 356037455 A | | 4/1981 | |
| JP | 56-74554 | * | 6/1981 | 126/692 |
| JP | 357077857 | | 5/1982 | 126/651 |
| JP | 360140046 | * | 7/1985 | 126/662 |
| JP | 61-8562 | * | 1/1986 | 126/662 |
| JP | 62-251703 | * | 11/1987 | 126/692 |
| JP | 2001-91059 | * | 4/2001 | 126/692 |
| JP | 2001-221514 | * | 8/2001 | 126/692 |
| RU | 001772540 A1 | | 10/1992 | |

OTHER PUBLICATIONS

"How To Say What Stuff Looks Like", ISBN 0–919951–13–9, Thoma Rieder, pp. 54–55.*

* cited by examiner

*Primary Examiner*—Carl D. Price
(74) *Attorney, Agent, or Firm*—Schmeiser, Olsen & Watts LLP

(57) ABSTRACT

An improved solar collector pipe that directly conveys fluid to be heated and collects and transfers solar energy efficiently and directly to the internal fluid, thereby maximizing both the amount of energy transmitted to the internal fluid and the peak temperature attainable by that fluid. The solar collector pipe includes a transparent portion for admitting solar energy into the solar collector pipe. Internal to the solar collector pipe is an absorbing portion for absorbing solar energy. A conduit portion is also included and comprises a reflecting surface thereon for reflecting solar energy received through the transparent portion onto the absorbing portion. In embodiments of the invention, the transparent portion, the conduit portion, and the absorbing portion together define at least one fluid passageway for conveying the fluid. In other embodiments of the invention, an internal conduit defines a fluid passageway for conveying the fluid. The internal conduit may be supported within the solar collector pipe and supported by heat-absorbing portions, or may be placed between two solar collector pipe sections to form a single solar collector pipe with an internal conduit extending therethrough.

28 Claims, 13 Drawing Sheets

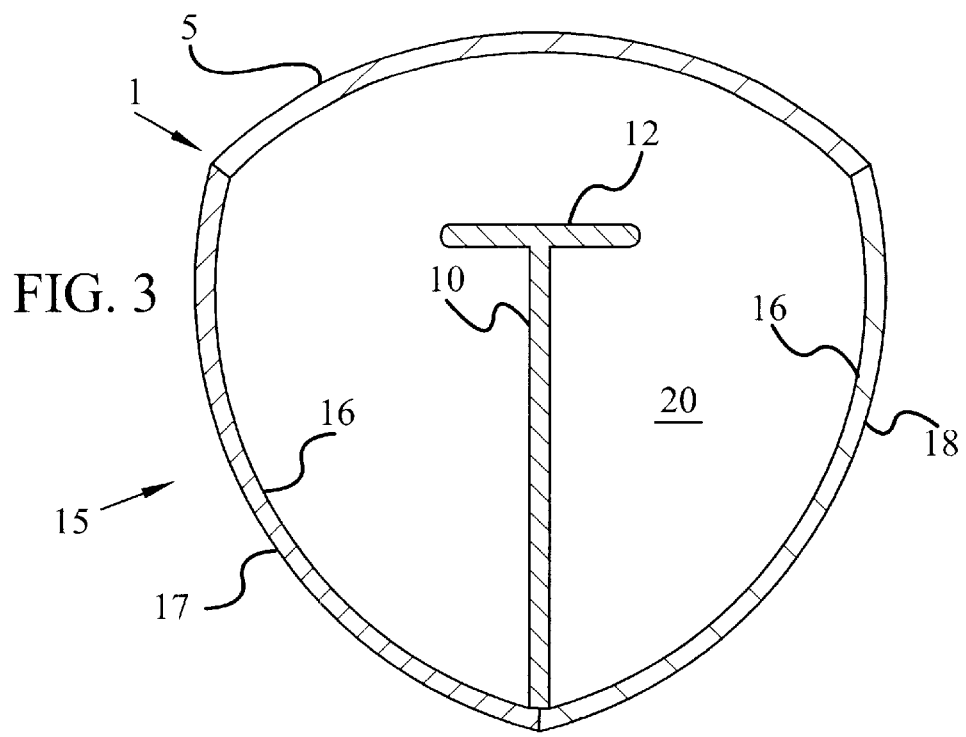
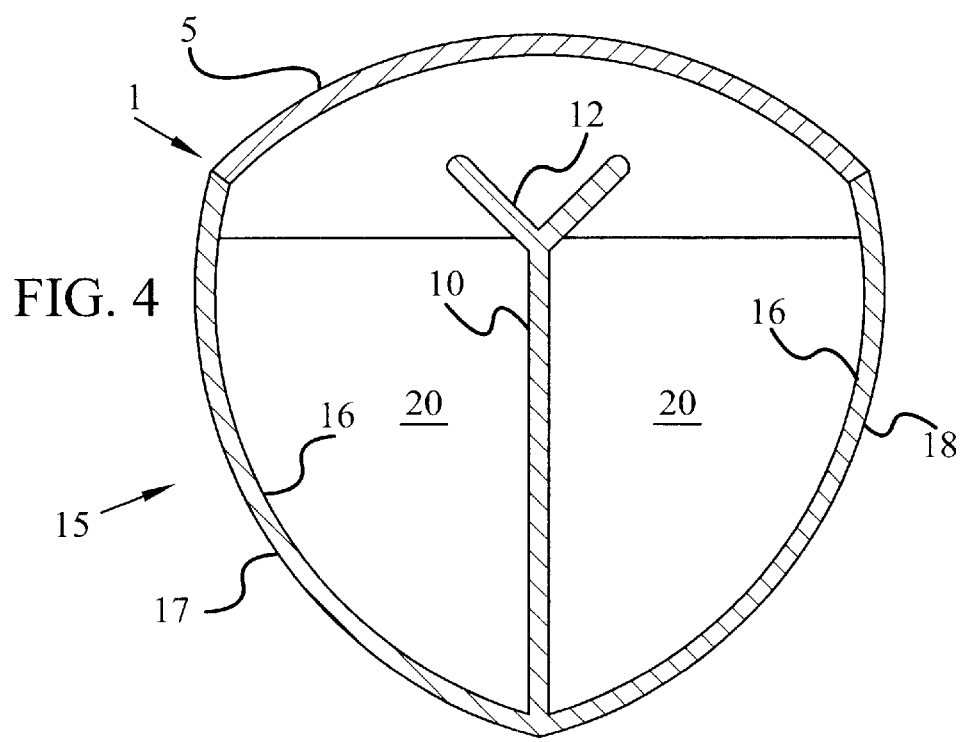

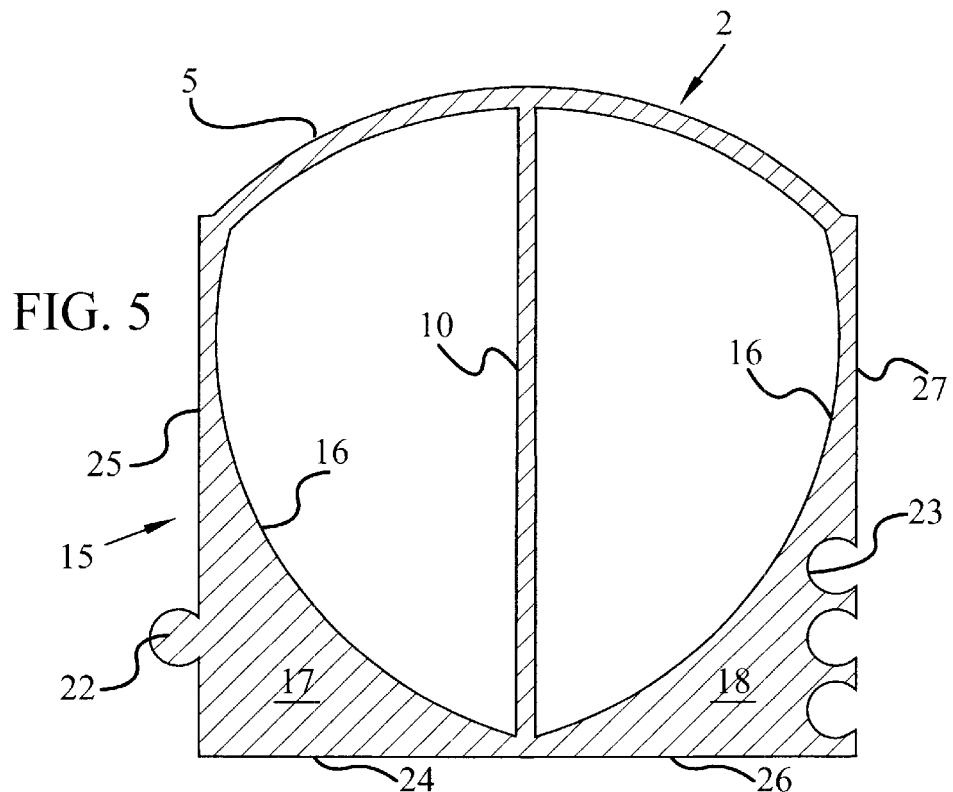
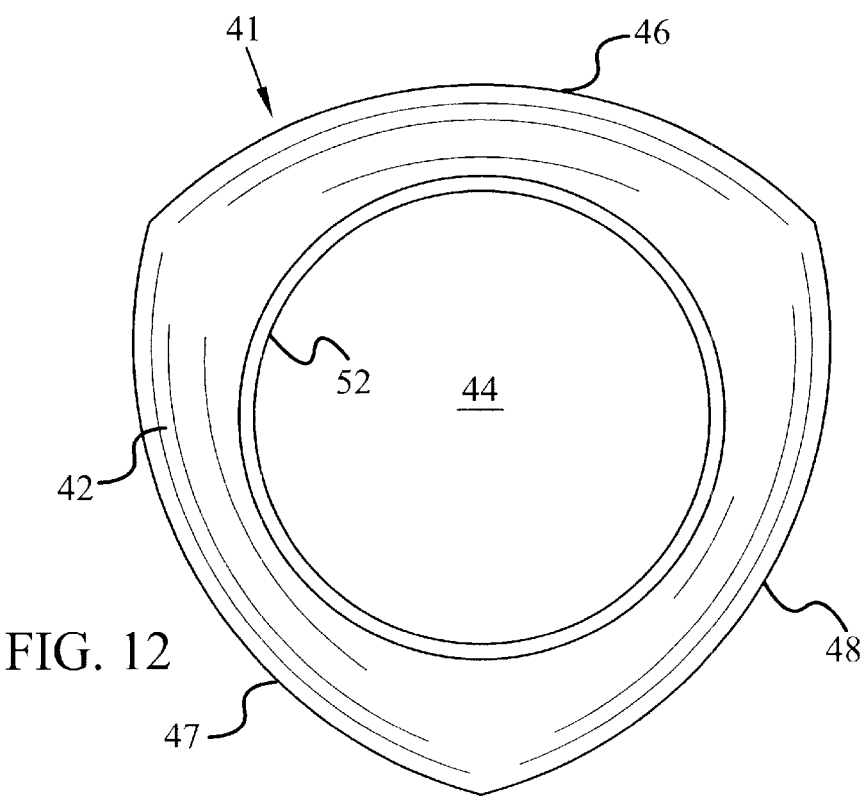

SOLAR COLLECTOR PIPE

REFERENCE TO RELATED APPLICATION

This application is a continuation-in-part application of earlier filed U.S. patent application Ser. No. 09/952,597, filed Sep. 11, 2001.

BACKGROUND OF INVENTION

1. Technical Field

This invention relates to the field of solar energy collection, and more specifically, to a solar collector pipe.

2. Background Art

With the increasing cost of conventional fuel and energy for heating and cooling, much attention has been directed to the possibility of the use of sunlight as a source of energy for heating. Assorted solar water heating systems have previously been provided. For example, some conventional solar water heating systems involve a box which uses a transparent glass plate as a top surface of the box. Inside the box, a plurality of round black PVC pipes are placed in a snake-like pattern, back and forth through the box. Other conventional solar water heating systems involve a water-containing, round, black tube heated by solar radiation in the center of a space defined by a solar energy collector.

Both of these types of conventional solar water heating systems are placed in a location exposed to the sun, such as on the roof of a home, and water pipes, such as for a back-yard pool, are attached to either end of the round pipe network. When the sun shines down through the glass on the top of the box or through the solar energy collector, heat energy is absorbed by the black pipes inside the box or collector. The heat energy is then transmitted to the water flowing inside the pipes, thereby eventually heating the water.

These conventional solar water heating systems, however, have certain drawbacks. Conventional systems are inefficient in energy collection. That is, they do not collect and transfer solar energy efficiently and directly to the water. Thus, whatever form the solar energy absorbing element may take (e.g. black, water-containing tube), it is inherently inefficient and is continually losing a significant portion of the absorbed energy by the well known mechanisms of convection, conduction and radiation. The interaction of these heat loss mechanisms limits both the amount of energy transmitted by the absorber to the internal adjacent fluid and the peak temperature attainable by that fluid.

Conventional systems are also expensive to manufacture and difficult to install, requiring a substantial amount of labor on-site during installation, thereby resulting in a system which is difficult and expensive to maintain. For example, conventional pipe and box systems are inordinately large (i.e. 12 ft.×24 ft.×8 in.), often covering significant portions of the structure being heated, and are expensive (i.e. $6000–$10,000). The size of the box presents a variety of problems. A significant amount of space must be provided to house such components. Furthermore, since such components are generally relatively heavy, the supporting structure must often be strengthened in some way to accommodate the excess weight of the components involved.

In an effort to overcome these size disadvantages, other types of solar energy collector systems have been developed which attempt to eliminate the need for large flat pipe and box systems of the type previously described. These solar energy collector systems, however, while often reduced in size, generally involve a combination of dissimilar structural elements which are often costly and complex. This also leads to many of the disadvantages previously described in conjunction with the large flat pipe and box systems.

DISCLOSURE OF INVENTION

Therefore, it would be advantageous in the art to have a highly efficient solar collector which is easy to manufacture and assemble, is easy to maintain and repair, and is structured of inexpensive materials, thereby overcoming the aforementioned disadvantages of conventional solar heating systems. Embodiments of the present invention solve these problems through a solar collector pipe that directly conveys fluid to be heated and collects and transfers solar energy efficiently and directly to the internal fluid, thereby maximizing both the amount of energy transmitted to the internal fluid and the peak temperature attainable by that fluid.

In association with an embodiment of present invention, a solar collector pipe includes a transparent portion for admitting solar energy into the solar collector pipe. Internal to the solar collector pipe is an absorbing portion for absorbing solar energy. A conduit portion is also included and comprises a reflecting surface thereon for reflecting solar energy received through the transparent portion onto the absorbing portion. The transparent portion, the conduit portion, and the absorbing portion together define at least one fluid passageway for conveying the fluid.

Accordingly, the solar collector pipe of this invention has many advantages, one of which is that it is highly efficient. That is, by providing a transparent portion and a conduit portion (with an internal reflecting surface) with certain shapes, such as parabolic shapes, solar energy is appropriately directed to the absorbing portion, particularly if it is located along a vertical center axis of the solar collector pipe. Thus, fluid within the solar collector pipe may be heated directly by the solar energy transmitted through the transparent portion, as well as by reflected energy from the reflecting surface of the conduit portion and through heat transfer from the heat absorbing portion. Additionally, the solar collector pipe of the present invention is relatively inexpensive and easy to manufacture, assemble, maintain, and repair.

In particular embodiments of the invention, the fluid within the solar collector pipe is carried within a conduit inside the solar collector pipe which is integral with the heat absorbing portion of the pipe rather than being carried by the reflecting portion of the pipe. In this way, the reflected heat energy from the larger solar collector pipe area may be focussed on a smaller amount of water, and the heat may be efficiently transferred thereto. In other embodiments of the invention, the internal conduit is carried between two heat absorptive parts of the solar collector pipe and held together with an appropriately shaped clamp. Endcaps, connectors and securing brackets similar to those described in reference to other embodiments of the invention may also be used.

The foregoing and other features and advantages of the present invention will be apparent to those of ordinary skill in the art from the following more particular description of the invention, as illustrated in the accompanying drawings.

BRIEF DESCRIPTION OF DRAWINGS

The invention will hereinafter be described in conjunction with the appended drawings, where like designations denote like elements, and:

FIG. 3 is a cross-sectional end view of a solar collector pipe embodiment of the invention with a T-shaped absorbing portion;

FIG. 4 is a cross-sectional end view of a solar collector pipe embodiment of the invention with a Y-shaped absorbing portion;

FIG. 5 is a cross-sectional end view of another solar collector pipe embodiment of the invention with a locking tab configuration;

FIG. 12 is an end plan view of another pipe connector embodiment of the invention configured to connect a solar collector pipe embodiment of the invention with a cylindrical pipe;

DETAILED DESCRIPTION OF INVENTION

Figure 1:
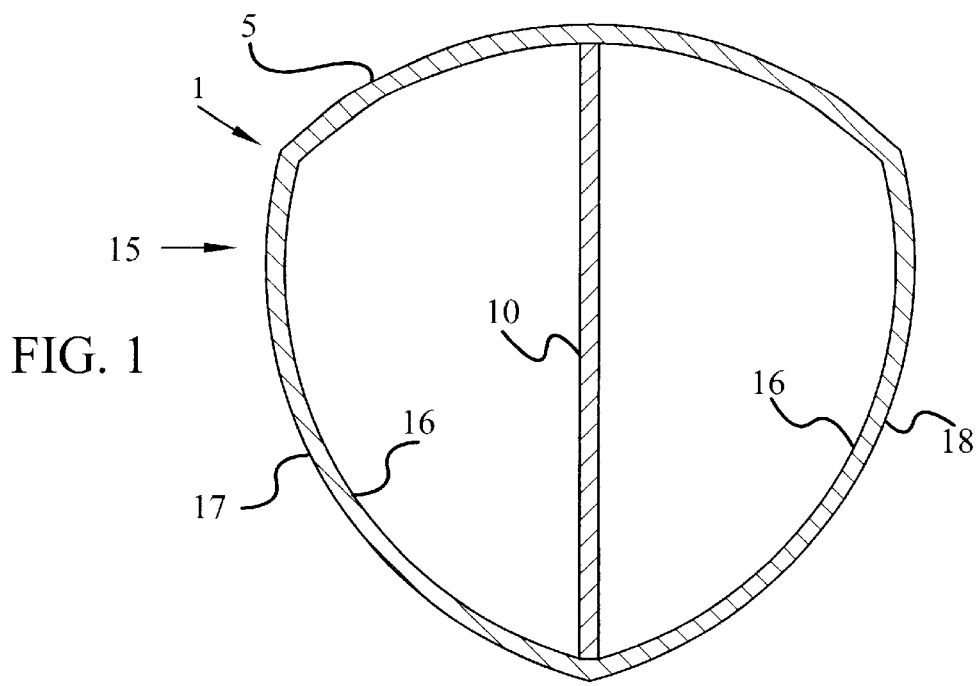
FIG. 1 is a cross-sectional end view of a solar collector pipe embodiment of the invention taken on line 1—1 of FIG. 13.

Although the present invention may be readily adapted to a variety of embodiments of a solar collector pipe, with reference to FIGS. 1–4, solar collector pipe 1 is an example of a solar collector pipe of the invention. It will be understood by one of ordinary skill in the art that the invention is not limited to the specific structures illustrated in the drawings.

Solar collector pipe 1 directly conveys internal fluid 20 to be heated and collects and transfers solar energy efficiently and directly to fluid 20, thereby maximizing both the amount of energy transmitted to fluid 20 and the peak temperature attainable by fluid 20. Solar collector pipe 1 includes transparent portion 5 for admitting solar energy into solar collector pipe 1. Absorbing portion 10 for absorbing solar energy is internal to solar collector pipe 1. Conduit portion 15 is also included and comprises reflecting surface 16 thereon for reflecting solar energy received through transparent portion 5 onto absorbing portion 10. In one embodiment, solar collector pipe 1 has an overall size of approximately a 4" height by a 4" width. However, other embodiments of solar collector pipe 1 comprise many other smaller and larger sizes depending upon the particular application, and the individual components of solar collector pipe 1 may be any size as well.

Transparent portion 5 may be any shape, but for particular embodiments of the invention forms one of an arc shape, a cambered shape, a parabolic shape, a catenary shape, and a semi-elliptical shape in cross-section. As depicted in FIGS. 1–4 and for the exemplary purposes of this disclosure, transparent portion 5 has a cambered shape in cross-section.

Figure 2:
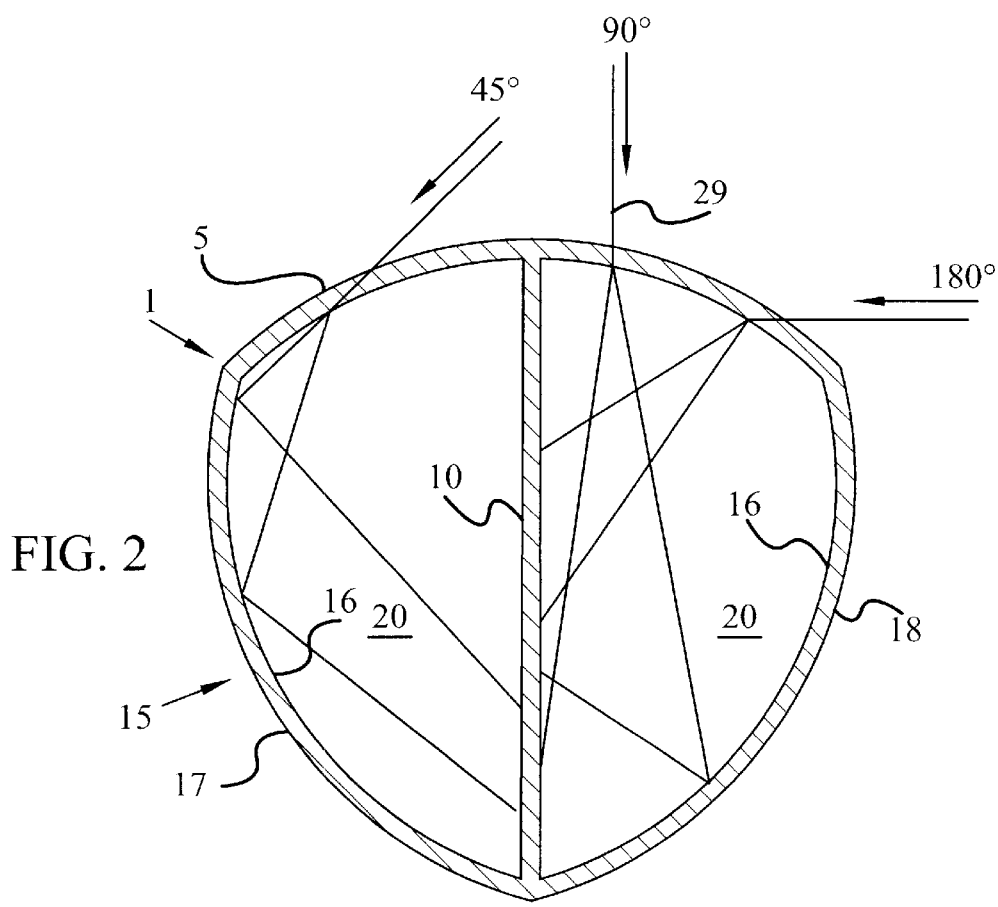
FIG. 2 is a cross-sectional end view of the solar collector pipe embodiment of FIG. 1 illustrating, for different angles of incidence to the solar collector pipe, the path of solar energy and its reverberation onto an I-shaped absorbing portion.
Figure 6:
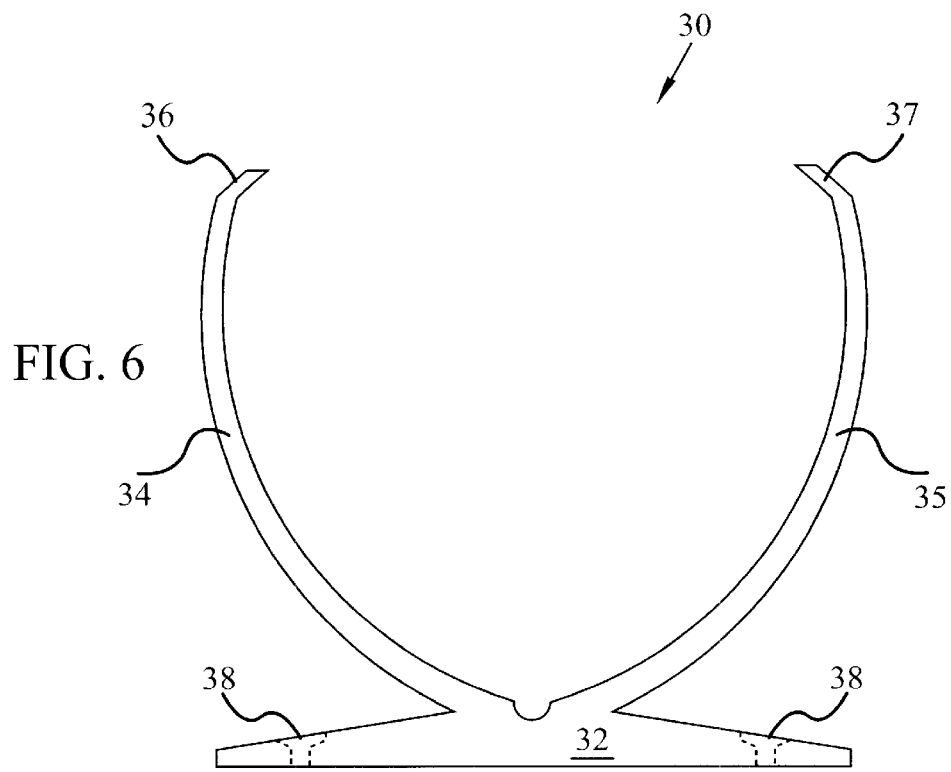
FIG. 6 is an end plan view of a mounting bracket embodiment of the invention that is configured to removably mount a solar collector pipe configured according to an embodiment of the invention.

As depicted in FIGS. 1–2 and for the exemplary purposes of this disclosure, absorbing portion 10 is on a vertical center axis of solar collector pipe 1, wherein absorbing portion 10 is substantially vertical and forms an I-shape. A lower portion of absorbing portion 10 contacts reflecting surface 16 and upper portion 12 of absorbing portion 10 contacts transparent portion 5.

Notwithstanding the foregoing, there are many other embodiments of absorbing portion 10. In some embodiments, absorbing portion 10 is located anywhere in solar collector pipe 1 that is conducive to receiving solar radiation, and therefore, is not limited to being located on a vertical center axis of solar collector pipe 1. Moreover, in another embodiment, absorbing portion 10 comprises a plurality of absorbing portions. Upper portion 12 of absorbing portion 10 forms a T-shape and a Y-shape in the embodiments depicted in FIGS. 3–4 respectively. Even so, upper portion 12, or for that matter absorbing portion 10 itself, may be any other shape as well that is conducive to receiving solar radiation. Additionally, upper portion 12 of absorbing portion 10 does not contact transparent portion 5 in the embodiments depicted in FIGS. 3–4, but in other embodiments it does.

Conduit portion 15 comprises opposing wall portions 17 and 18 on either side of a vertical center axis of solar collector pipe 1 and a reflecting surface 16 thereon. Conduit portion 15 may be any shape, but in particular embodiments of the invention opposing wall portions 17 and 18 together form one of an ogive shape, a dropped ogive shape, an equilateral ogive shape, a lancet ogive shape, and an arc shape in cross-section. As depicted in FIGS. 1–4 and for the exemplary purposes of this disclosure, conduit portion 15 has a dropped ogive shape in cross-section.

Reflecting surface 16 may be integral or unitary with conduit portion 15. Alternatively, reflecting surface 16 may be integrally joined to conduit portion 15 and comprise the inside or outside surface of conduit portion 15, or reflecting surface 16 may be coupled to the inside or outside surface of conduit portion 15. Thus, conduit portion 15 may comprise an inside, integral, or outside reflecting surface.

As depicted in the square or rectangular base embodiment of conduit portion 15 in FIG. 5, opposing wall portion 17 comprises locking tab 22 that protrudes outwardly from adjoining surface 25 of opposing wall portion 17, as well as base surface 24. Opposing wall portion 18 comprises base surface 26 and adjoining surface 27, wherein adjoining surface 27 defines at least one opposing tab slot 23 positioned inwardly therein. Adjoining surface 25 and base surface 24, and adjoining surface 27 and base surface 26, each respectively form a right angle such that the square or rectangular base embodiment of conduit portion 15 may sit flat on a structure. Alternatively, angled bases may be used to accommodate angled structures. Locking tab 22, tab slot 23, adjoining surfaces 25 and 27, and base surfaces 24 and 25 may extend along the entire length of solar collector pipe 1, or may alternatively form a series of distinct sections located at select locations along the entire length of solar collector pipe 1. Notwithstanding, these components, whether extending along the entire length of solar collector pipe 1 or in a series of distinct sections, may either be integrally joined with opposing wall portions 17 and 18 as in FIG. 5, or coupled thereto.

At least one opposing tab slot 23 is configured to receive locking tab 23 of an opposing wall portion of a different solar collector pipe in removable engagement such that the adjoining surfaces of each solar collector pipe abut against at least portions of one another. However, as specifically depicted in FIG. 5, at least one opposing tab slot 23 may comprise a plurality of tab slots 23, each of which is configured to receive locking tab 23 of an opposing wall portion of a different solar collector pipe in removable engagement such that the different solar collector pipe may be positioned to account for a plurality of structural angles. Additionally, opposing wall portions 17 and 18 may be formed of any of many different types of insulative materials that eliminate conduction and convection heat losses, such as hardened foam. Alternatively, opposing wall portions 17 and 18 may each define an internal space therein that may be filled with insulative materials, such as hardened foam.

Transparent portion 5 may be formed of any of many different types of solar radiation-transmissive materials, such as glass and transparent composites, polymers, polycarbonates, polystyrenes, or other plastic materials known in the art for example. Absorbing portion 10 may be formed of any of many different types of solar energy absorbing materials, such as dark or black: glass, composites, polymers, polycarbonates, polystyrenes or other plastic materials known in the art, or vitreous ceramic materials formed of clay and various fluxes for example. Alternatively, absorbing portion 10 may have a dark or black coating layer thereon, such as chrome black. Conduit portion 15 may be formed of any of many different types of fluid conveying materials that can readily be formed into shaped objects, such as composites, polymers, polycarbonates, polystyrenes or other plastic materials known in the art for example, vitreous ceramic materials formed of clay and various fluxes, metals, such as corrosion-resistant metals like zinc or magnesium, or alloys, such as aluminum. Reflecting surface 16 may be formed of any of many different types of solar energy reflecting materials, such as Al, Cu, Pb, Ag, or Au for example. Reflecting surface 16 may be formed by a curved, polished sheet or flexible foil of such materials which is formed on the inside or outside surface of conduit portion 15, or may be a layer or coating of such materials on the inside or outside surface of conduit portion 15. Alternatively, the materials forming reflecting surface 16 may be integrally mixed with the materials forming conduit portion 15.

The components defining any solar collector pipe embodiment of the invention may be manufactured separately and then assembled together. However, the components may be manufactured simultaneously and integrally joined with one another. Manufacture of these components separately or simultaneously may involve either extrusion, injection molding, casting, milling, or the like. If any of the components are manufactured separately, they may then be sealingly coupled with one another in any manner known in the art, such as with adhesive or a weld for example, depending on, among other considerations, the particular material forming the components. Accordingly, as depicted in the embodiment of FIGS. 1–2, transparent portion 5 is integrally joined to conduit portion 15. Nevertheless, as depicted in the embodiment of FIG. 3, transparent portion 5 and opposing wall portions 17 and 18 of conduit portion 15 are distinct portions sealingly coupled together. Alternatively and as depicted in the embodiment of FIG. 4, transparent portion 5 and conduit portion 15 are distinct portions sealingly coupled together. Referring to the embodiment depicted in FIG. 2, absorbing portion 10 is integrally joined to transparent portion 5 and conduit portion 15, while in the embodiment depicted in FIG. 4, absorbing portion 10 is integrally joined to only conduit portion 15. However, absorbing portion 10 is sealingly coupled to transparent portion 5 and conduit portion 15 in the embodiment depicted in FIG. 1, while absorbing portion 10 is sealingly coupled to only conduit portion 15 in the embodiment depicted in FIG. 3. Alternatively, absorbing portion 10 may be an insert in solar collector pipe 1. For example, absorbing portion 10 may be coupled into opposing grooves located internal to solar collector pipe 1 on conduit portion 15 and transparent portion 5 in a tongue and groove arrangement.

The solar collector pipe embodiments of the present invention provide for an improved and highly efficient process of heating fluid 20. This process includes conveying fluid 20 to be heated through a solar collector pipe of the present invention configured to admit solar energy to fluid 20 through transparent portion 5. Fluid 20 conveyed within solar collector pipe 1 may be any desired heat retaining fluid, such as, for example, air, water, oil, gel, a food-grade antifreeze mixture or any combination of such fluids. Thus, as fluid 20 to be heated is conveyed through solar collector pipe, fluid 20 may be in direct contact with at least a portion of absorbing portion 10 and at least a portion of reflective surface 16 if reflecting surface 16 is integral with or coupled to an inside surface of conduit portion 15 as previously described. Alternatively, fluid 20 may be in direct contact with at least a portion of absorbing portion 10 and at least a portion of conduit portion 15 if reflecting surface 16 is coupled to an outside surface of conduit portion 15 as previously described. As solar energy is then admitted into solar collector pipe 1 through transparent portion 5, fluid 20 is heated in any two of a direct manner, a direct reflective manner, and a conductive manner.

More specifically and for the exemplary purposes of this disclosure, internal fluid 20 is in direct contact with at least a portion of reflecting surface 16 coupled to an inside surface of conduit portion 15 and at least a portion of absorbing portion 10, as illustrated in the embodiment of FIG. 4. Notwithstanding, fluid 20 may further be in direct contact with at least a portion of transparent portion 5, or completely fill solar collector pipe 1, as depicted in FIGS. 2–3, thereby directly contacting transparent portion 5, absorbing portion 10, and reflecting surface 16. Fluid 20 is heated in a direct manner, a direct reflective manner, and a conductive manner, but typically in all three manners. Thus, solar collector pipe 1 is highly efficient in that it collects and transfers solar energy efficiently to internal fluid 20, thereby maximizing both the amount of energy transmitted to internal fluid 20 and the peak temperature attainable by fluid 20.

Turning to FIG. 2 specifically, there is indicated for different points of time of the day with associated sun's altitudes the pattern of the incident and reverberated solar energy, such as light rays 29, depicted in FIG. 2 at 45°, 90°, and 180°. Through solar collector pipe 1, solar energy is collected over a direction range extending substantially through 180° from East to West, even if solar collector pipe 1 is in a stationary arrangement. Thus, effective collection is ensured from very early in the morning till very late in the afternoon. Moreover, during the early morning hours and the late afternoon hours, a substantial portion of the collected solar energy directly impinges on absorbing portion 10 and at an angle that is favorable for the contemplated heating. It is clear that all collected rays eventually find their way either directly or otherwise by substantially only single reverberation to absorbing portion 10 arranged along the vertical center axis of solar collector pipe 1. The directions according to which the incident or "captured" solar energy impinge on reflective surface 16 typically do not enclose an angle having the value zero to the perpendicular on reflective surface 16 at the place of incidence, so that no captured solar energy may be reverberated outwardly. Moreover, solar energy that does not directly impinge on absorbing portion 10 reaches it typically after one reverberation, which enhances the effective heating. Additionally, fluid 20 acts as a lense to refract and spread solar energy through fluid 20 and onto absorbing portion 10, again enhancing the effective heating.

Turning now to FIGS. 6–9, this invention also includes a mounting bracket for removably mounting a solar collector pipe of the invention against a structure in order to maximize exposure to solar energy by directing the solar collector pipe toward the sun on a variety of different angles and at a variety of geographic locations. Through mounting brackets of the invention, solar collector pipes of the invention are easily incorporated on roofs of all kinds of inclinations, as well as upright walls, other support structures, and the like.

For the exemplary purposes of this disclosure, mounting bracket 30 embodiments depicted in FIGS. 6–9 are configured to removably mount solar collector pipe 1. Mounting bracket 30 generally includes base 32 for removably coupling mounting bracket 30 to the structure. Opposing engaging members 34 and 35 are respectively located on either side of a vertical center axis of mounting bracket 30 and together form one of an ogive shape, a dropped ogive shape, an equilateral ogive shape, a lancet ogive shape, and an arc shape As depicted in FIGS. 6–9 and for the exemplary purposes of this disclosure, opposing engaging members 34 and 35 together form a dropped ogive shape. Opposing engaging members 34 and 35 are coupled to base 32 or are integrally joined therewith, and are configured to removably mount solar collector pipe 1.

Opposing engaging members 34 and 35 of mounting bracket 30 include upper retaining portions 36 and 37 respectively protruding inward towards the vertical center axis of mounting bracket 30. Upper retaining portions 36 and 37 are configured to removably retain solar collector pipe 1 when it is removably mounted by opposing engaging members 34 and 35. That is, upper retaining portions 36 and 37 snap over the edges of solar collector pipe 1 formed where opposing wall portions 17 and 18 meet with transparent portion 5. Notwithstanding the foregoing, other embodiments of the mounting bracket of the invention may not include upper retaining portions 36 and 37.

Figure 8:
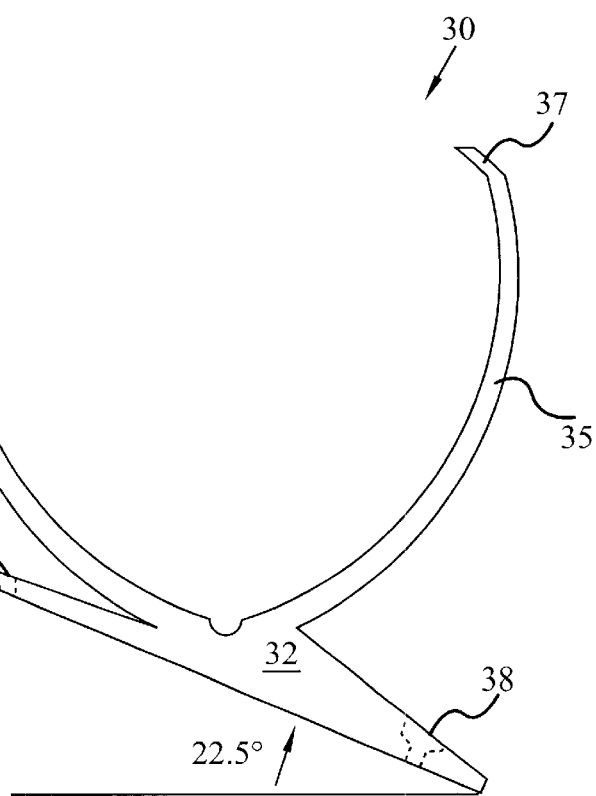
FIG. 8 is an end plan view of yet another mounting bracket embodiment of the invention similar to that of FIG. 6, but having a base positioned at a 22.5° angle.

Various embodiments of mounting brackets of the invention exist for improving the collection efficiency and/or concentration of solar energy by proper orientation of a solar collector pipe of the present invention. The solar collector pipe may operate efficiently with no required adjustment of tilt angle. Accordingly, mounting bracket 30 embodiments of FIGS. 6, 8, and 9 mount solar collector pipe 1 in a non-tilting, vertical orientation. Base 32 of mounting bracket 30 may be positioned at any angle from a horizontal lower axis of mounting bracket 30, such as in the range of 0° to 90°, and still maintain the non-tilting, vertical orientation of solar collector pipe 1. For example, as depicted in the embodiment of FIG. 8, base 32 is positioned at 22.5° from a horizontal lower axis of mounting bracket 30. As another example, base 32 is positioned at 45° from a horizontal lower axis of mounting bracket 30 as depicted in the embodiment of FIG. 8. The base 32 angle embodiments depicted in FIGS. 8–9 reflect conventional roof inclinations.

Figure 7:
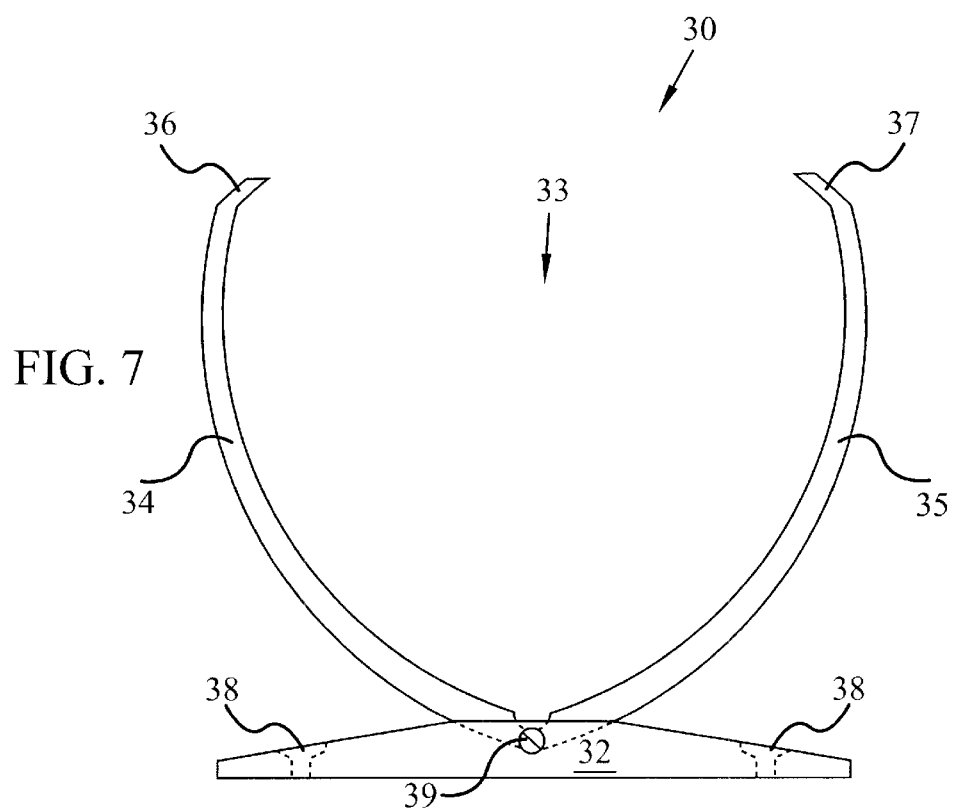
FIG. 7 is an end plan view of another mounting bracket embodiment of the invention similar to that of FIG. 6, but configured to be adjustable between a plurality of angles.
Figure 9:
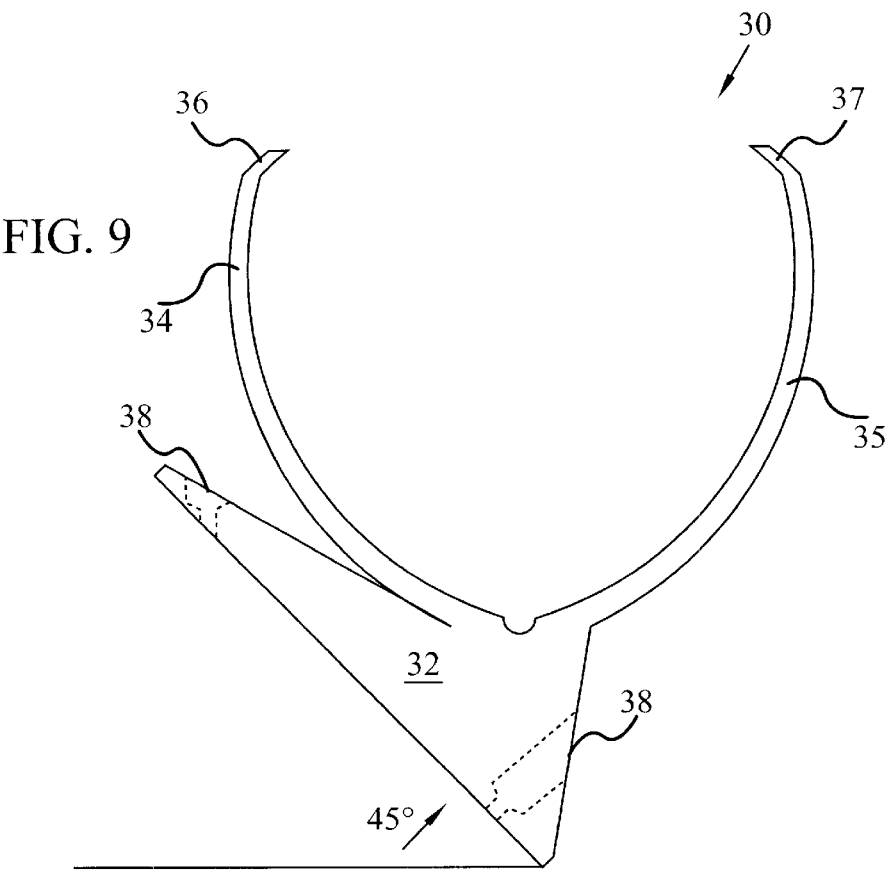
FIG. 9 is an end plan view of still another mounting bracket embodiment of the invention similar to that of FIG. 6, but having a base positioned at a 45° angle.

Alternatively, solar collector pipe 1 may be arranged movably, pivoting along with the position of the sun, with a view to an optimal incidence of solar radiation. To achieve this necessary performance, engaging members 34 and 35 of mounting bracket 30 may be integrally joined together at their lower portions, thereby forming unitary engaging member 33 as depicted in the embodiment of FIG. 7. Unitary engaging member 33 is adjustable on base 32 between a plurality of angles. In the embodiment of FIG. 7, unitary engaging member 33 pivots around fastener 39, such as a screw. That is, the vertex of unitary engaging member 33 is located in a receiving notch defined inwardly from a top surface of base 32. Fastener 39 extends through holes in base 32 and through the vertex portion of unitary engaging member 33, allowing unitary engaging member 33 to pivot to a desired angle and then to be removably secured in place. Thus, the mounting bracket 30 embodiment of FIG. 7 allows for an intermittent change of solar collector pipe 1 orientation. Notwithstanding the foregoing, unitary engaging member 33 may be continuously oriented, with the requisite sensors, controls and motor-drive mechanism.

In another embodiment of mounting bracket 30, mounting bracket 30 comprises a square or rectangular base embodiment similar to square or rectangular base embodiment of conduit portion 15 in FIG. 5. Particularly in this mounting bracket 30 embodiment, opposing engaging member 34 of FIG. 6 further comprises a locking tab protruding outwardly from an adjoining surface of opposing engaging member 34, as well as a base surface. Opposing engaging member 35 of FIG. 6 further comprises a base surface and an adjoining surface as well, wherein the adjoining surface defines at least one opposing tab slot positioned inwardly therein. Respective adjoining surfaces and base surfaces together form a right angle such that the square or rectangular base embodiment may sit flat on a structure. Alternatively, angled bases may be used to accommodate angled structures. The locking tab, the tab slot, the adjoining surfaces, and the base surfaces may either be integral with opposing engaging members 34 and 35, or coupled thereto.

The at least one opposing tab slot is configured to receive a locking tab of an opposing engaging member of a different mounting bracket in removable engagement, such that the adjoining surfaces of each mounting bracket abut against at least portions of one another. However, the at least one opposing tab slot may comprise a plurality of tab slots, each of which is configured to receive a locking tab of an opposing engaging member of a different mounting bracket in removable engagement such that the different mounting bracket may be positioned to account for a plurality of structural angles. Additionally, opposing engaging members 34 and 35 of this square or rectangular base embodiment may be formed of any of many different types of insulative materials that eliminate conduction and convection heat losses, such as hardened foam. Alternatively, opposing engaging members 34 and 35 may each define an internal space therein that may be filled with insulative materials, such as hardened foam.

Mounting brackets of the invention may be formed of any of many different types of materials that can readily be formed into shaped objects, such as composites, polymers, polycarbonates, polystyrenes or other plastic materials known in the art for example, vitreous ceramic materials formed of clay and various fluxes, metals, such as corrosion-resistant metals like zinc or magnesium, or alloys, such as aluminum, or any other material that is sufficiently resilient to allow solar collector pipe 1 to be snapped into engaging members 34 and 35 with upper retaining portions 36, yet sufficiently rigid to hold solar collector pipe 1 securely in place.

Mounting bracket components may be manufactured simultaneously and integrally joined with one another. These components may be manufactured by extrusion, injection molding, casting, milling, or the like. Mounting brackets may be cut into or form distinct sections to be placed at select locations along the entire length of solar collector pipe 1. These distinct sections may have a width of approximately 1", although they may have any smaller or larger width. Mounting brackets may then be coupled to a structure by using, for example, adhesive, a weld, a fastener (e.g. a screw, nail, bolt, etc.), or any other coupling mechanism, depending on the particular material forming mounting brackets and the material forming the structure, among other considerations. If screws are to be used, as in the embodiments depicted in FIGS. 6–9, screw holes 38 may be drilled through base 32 at any convenient angle and location therein.

Figure 10:
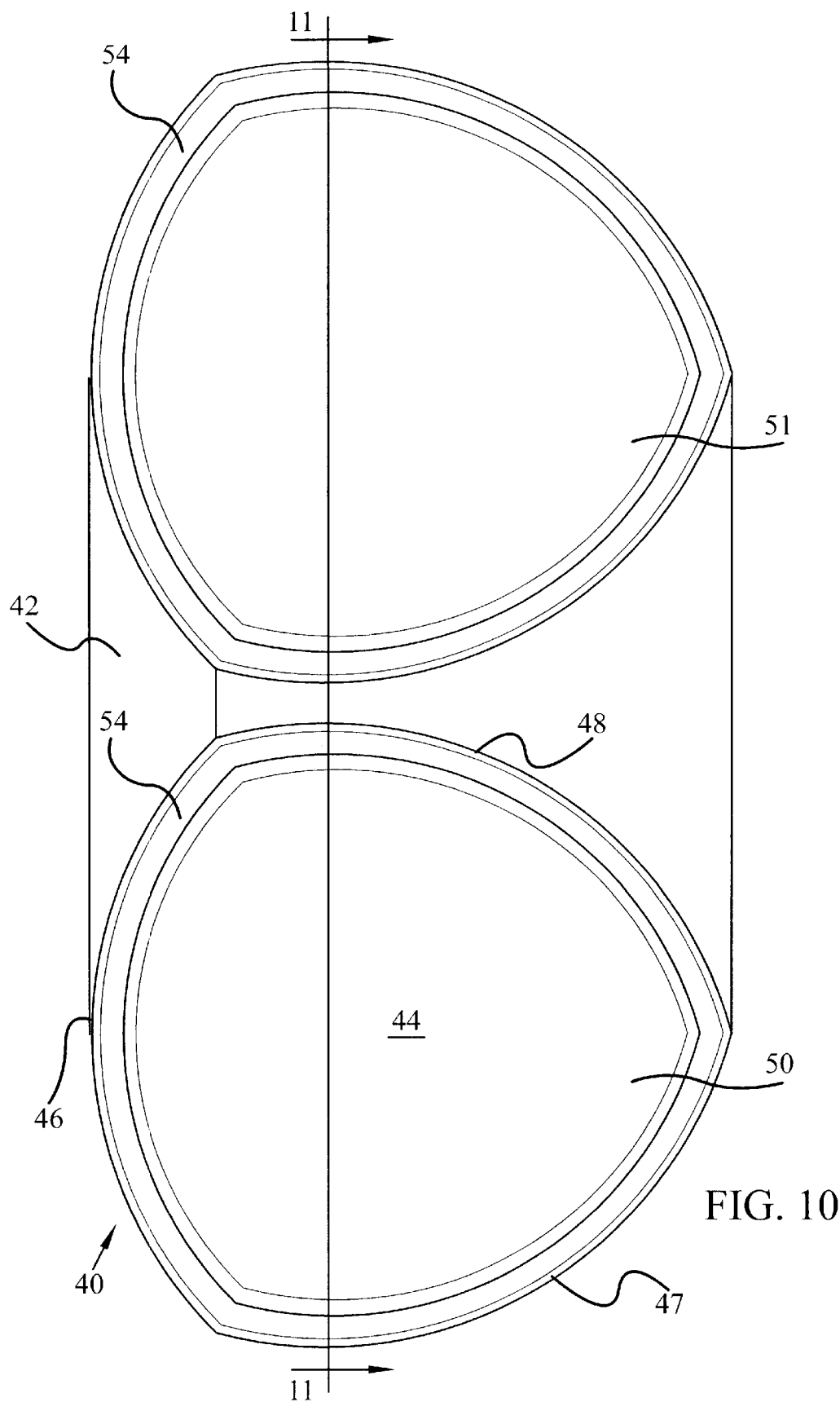
FIG. 10 is a front end plan view of a pipe connector embodiment of the invention configured to mate with two solar collector pipes configured according to embodiments of the invention.

This invention also includes a pipe connector for use with solar collector pipes of the invention. Turning now to FIGS. 10–13, pipe connector embodiments 40, 41, and 43, as well as other pipe connector embodiments, generally include a pipe connector body 42 that comprises at least one internal bore 44 therethrough, and three wall portions 46, 47, and 48. Wall portion 46 forms one of an arc shape, a cambered shape, a parabolic shape, a catenary shape, and a semi-elliptical shape. As depicted in FIGS. 10 and 12 and for the exemplary purposes of this disclosure, wall portion 46 has a cambered shape. Wall portions 47 and 48 oppose one another on either side of a vertical center axis of the pipe connector and together form one of an ogive shape, a dropped ogive shape, an equilateral ogive shape, a lancet ogive shape, and an arc shape. As depicted in FIGS. 10 and 12 and for the exemplary purposes of this disclosure, wall portions 47 and 48 together have a dropped ogive shape. At least two openings are also included for inlet of fluid into and outlet of fluid out of body 42, wherein at least one of the at least two openings is configured to mate with a solar collector pipe of the invention. However, the at least two openings may be configured to mate with solar collector pipes of the invention, such as in pipe connector embodiments 40 and 43 of FIGS. 10, 11, and 13, wherein openings 50 and 51 are each configured to mate with a solar collector pipe 1.

Figure 11:
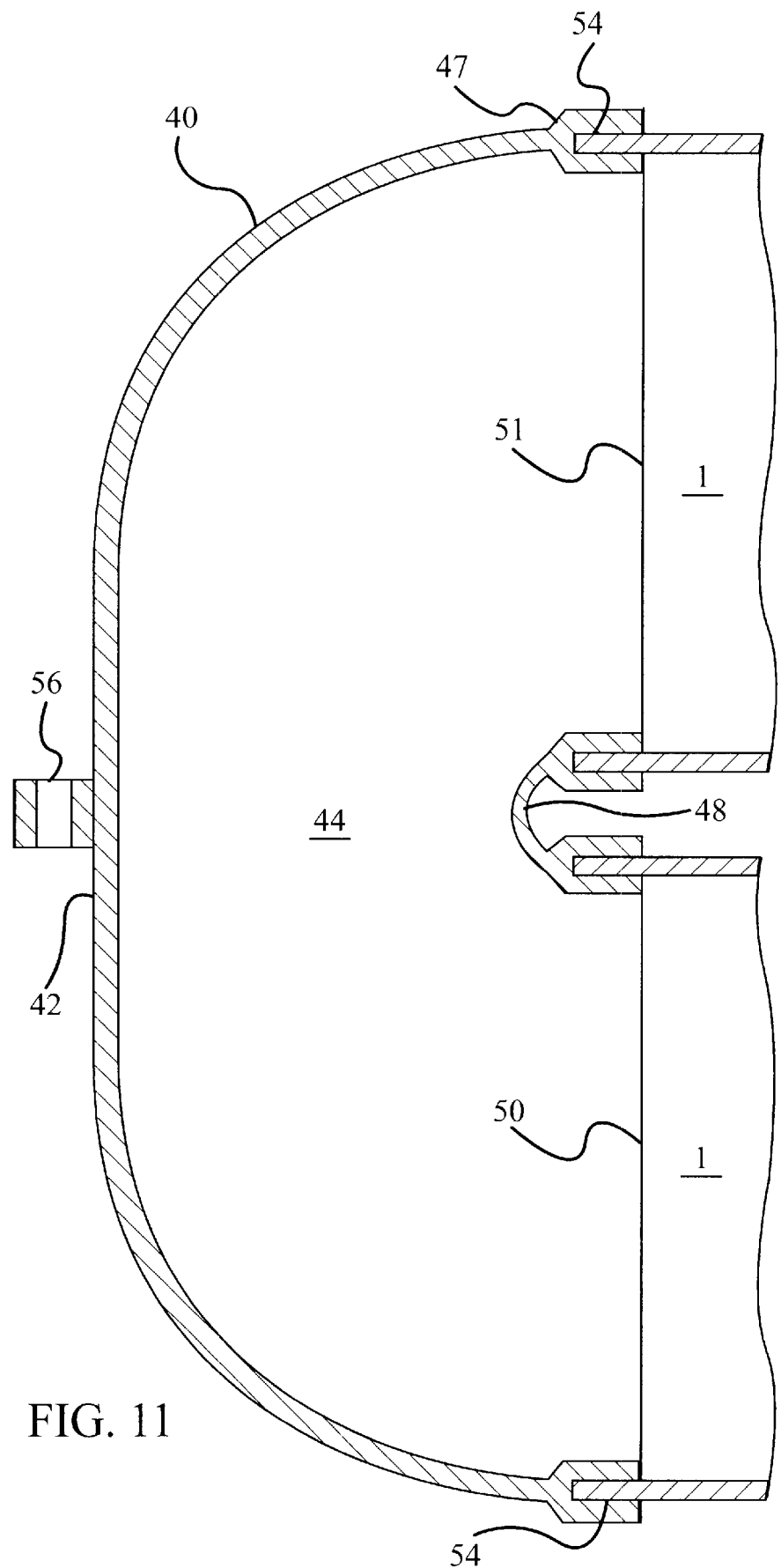
FIG. 11 is a cross-sectional view of the pipe connector embodiment of FIG. 10 taken on line 11—11 of FIG. 10 illustrating a tongue and groove arrangement of mating the pipe connector and the two solar collector pipes configured according to an embodiment of the invention.

Referring to FIGS. 10–11 particularly, a 180° end-to-end pipe connector embodiment 40 is depicted. Pipe connector 40 includes a pipe connector body 42 that comprises internal bore 44 therethrough and three wall portions 46, 47, and 48. Wall portion 46 forms a cambered shape. Wall portions 47 and 48 oppose one another on either side of a vertical center axis of pipe connector 40 and together form a dropped ogive shape. Two openings 50 and 51 are also included for inlet of fluid into and outlet of fluid out of body 42, and openings 50 and 51 are each configured to mate with an end of a solar collector pipe 1 in a tongue and groove arrangement. Specifically, wall portions 46, 47, and 48 define grooves 54 positioned inwardly therein at openings 50 and 51. As depicted in FIG. 11, ends of two solar collector pipes 1 are positioned into grooves 54 at openings 50 and 51. Alternatively, pipe connector 40 may comprise protrusion 56 coupled on or integrally joined with a back end of pipe connector 40 that is configured to removably mount pipe connector 40 against a structure.

Notwithstanding the foregoing, in other pipe connector embodiments of the present invention, body 42 may form an angular shape in the range of 0° (e.g., pipe connector 43 in FIG. 13) to 180° (e.g., pipe connector 40 in FIGS. 10–11). However, body 42 may form other shapes as well. For example, in one embodiment, the connector body 42 forms a T-shape, wherein at least one internal bore 44 branches into two internal bores in fluid flow communication with each other with three openings. In another exemplary embodiment, the connector body 42 forms a Y shape, wherein at least one internal bore 44 branches into three internal bores in fluid flow communication with each other with three openings. Additionally, the at least one of the at least two openings may be configured to mate with an end of solar collector pipe 1 in any other arrangement, such as in an arm and sleeve arrangement. That is, the at least one of the at least two openings may form a sleeve for receiving an end of solar collector pipe 1 inserted therein. For example, as depicted in pipe connector embodiment 41 of FIG. 12, opening 52 forms a cylindrical sleeve for receiving an end of a cylindrical pipe inserted therein.

Pipe connector embodiments 40, 41, and 43, as well as other pipe connector embodiments, may be formed of any of many different types of materials that can readily be formed into shaped objects, such as composites, polymers, polycarbonates, polystyrenes or other plastic materials known in the art for example, vitreous ceramic materials formed of clay and various fluxes, metals, such as corrosion-resistant metals like zinc or magnesium, or alloys, such as aluminum, or any other material fluid conveying material.

The components defining pipe connector embodiments 40, 41, and 43, as well as other pipe connector embodiments, may be manufactured separately and then assembled together, or may be manufactured simultaneously and integrally joined with one another. Manufacture of these components separately or simultaneously starts with either extrusion, injection molding, casting, milling, or the like. If any of the components are manufactured separately, they may then be sealingly coupled with one another in any manner known in the art, such as with an adhesive or a weld for example, depending on, among other considerations, the particular material forming the components. Those of ordinary skill in the art will be readily able to determine appropriate formation and coupling techniques known in the art for selected applications and materials.

Figure 15:
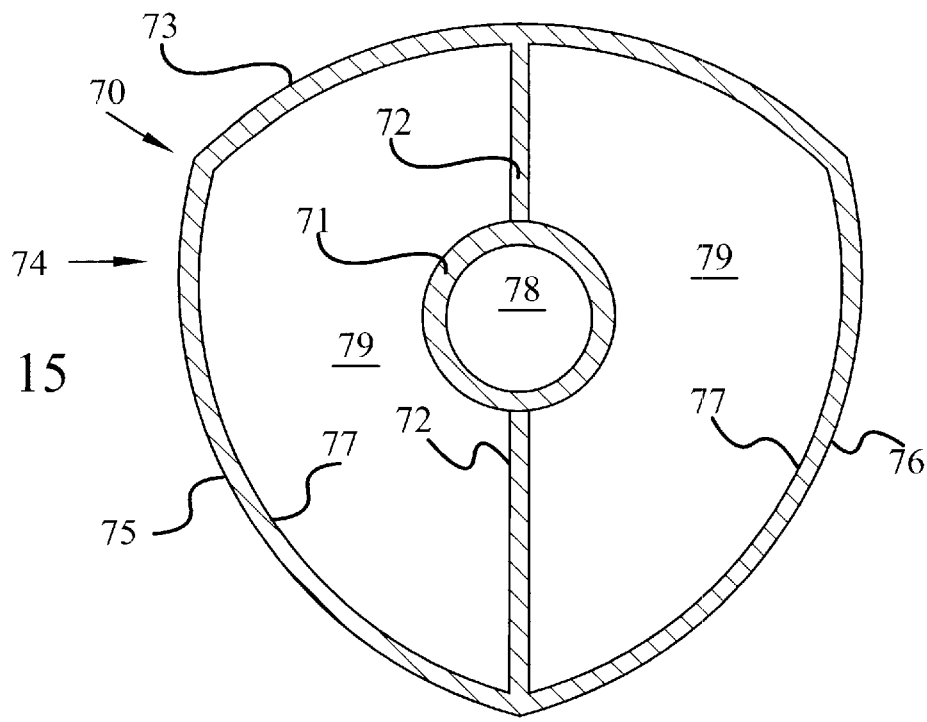
FIG. 15 is a cross-sectional end view similar to the view of FIG. 1, but of a solar collector pipe embodiment having an internal conduit for carrying fluid supported by two heat-absorptive fins.

FIG. 15 illustrates another embodiment of a solar collector pipe 70 similar to the solar collector pipe embodiment shown in FIGS. 1–4, but including a conduit 71 for carrying fluid within the solar collector pipe 70, and may be formed integrally with the absorbing supports 72. Like the solar collector pipe embodiment of FIGS. 1–4, the solar collector pipe 70 of this embodiment includes a transparent portion 73 for admitting solar energy into the solar collector pipe 70 and a conduit portion 74 which includes opposing wall portions 75 and 76 each having a reflecting surface 77 on an inner surface thereof. Distinct from the embodiment of FIGS. 1–4, the embodiment of FIG. 15, fluid 78 carried within the solar collector pipe 70 may be carried within the internal conduit 71 instead of, or in addition to fluid carried within the conduit portion 74. The internal conduit 71 may be sized to easily couple with existing plumbing fixtures (i.e. having a diameter of ½ inch, ¾ inch, 1 inch, and the like).

Figure 16:
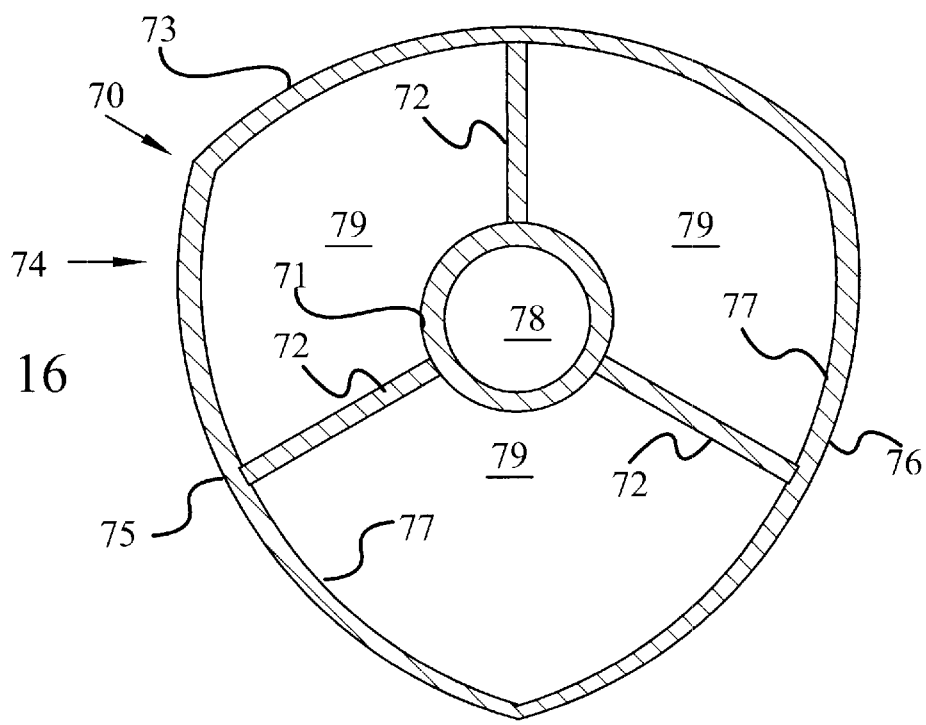
FIG. 16 is a cross-sectional end view similar to the view of FIG. 15, but of an embodiment having an internal conduit for carrying fluid supported by three heat-absorptive fins.

The internal conduit 71 is supported by the absorbing supports 72. The absorbing supports 72 may be continuous throughout a length of the solar collector pipe 70, or may be spaced periodically in sections along the solar collector pipe 70 as needed to support the internal conduit 71. The internal conduit 71 may be formed integrally and of the same absorbing material as the absorbing supports 72, or may be formed separately from the internal conduit 71 and merely support the internal conduit 71. For example, and without limitation, the internal conduit 71 may be a conventional black PVC pipe placed upon the absorbing supports 72 within the solar collector pipe 70. It is also contemplated that a conventional copper or aluminum metal pipe may be used as the internal conduit 71. By forming the internal conduit 71 integrally with the absorbing supports 72, such as through a common extrusion process, or by placing the internal conduit 71 in direct contact with the absorbing supports 72, heat is more readily transferred from the absorbing supports 72 to the internal conduit 71. As shown in FIG. 16, the absorbing supports 72 may alternatively be formed as three or more absorbing supports in any configuration for added support and heat absorption rather than merely the two supports shown in FIG. 15.

If the internal conduit 71 is used to carry the fluid 78 rather than the opposing sides 75 and 76 of the conduit portion 74 as in previous embodiments herein, many advantages may result. First, the internal conduit 78 may be easier to securely connect with existing plumbing fixtures available on the market than with embodiments having only the conduit portion 74. By connecting existing plumbing systems to an end of the internal conduit 71, conventional couplings may be used. Second, if the fluid is only within the internal conduit 71, rather than filling the conduit portion 74, the solar heat energy collected may be used to heat a smaller volume of fluid, allowing the fluid to be heated to a higher temperature. Third, with the smaller volume of fluid travelling through the internal conduit, the overall fluid-filled weight of the solar collector pipe 70 will be lighter than with other embodiments. Fourth, heat transfer efficiencies may be higher.

In one particular embodiment of the invention having an internal conduit 71, the volume 79 of the solar collector pipe 70 other than the internal conduit 71 is evacuated and vacuum sealed to increase the efficiency of heat transfer through the reflection and refraction of the heat energy to the absorbing supports 72 and the internal conduit 71. This may be accomplished by those of ordinary skill in the art through the use of a vacuum pump during manufacture of the solar collector pipe 70 by sealing the evacuated solar collector pipe 70 with an air-tight seal after it is evacuated and allowing the internal conduit to extend beyond the ends of the solar collector pipe 70. Alternatively, to allow the volume 79 of the solar collector pipe 70 to be evacuated more readily by an installer of a solar collector pipe system after cutting a particular solar collector pipe 70 for installation, an evacuation port may be included through an end cap to the solar collector pipe 70 (See FIGS. 22 and 23). The solar collector pipe 70 may be evacuated by a vacuum pump after end caps is installed with an air-tight seal.

Figure 17:
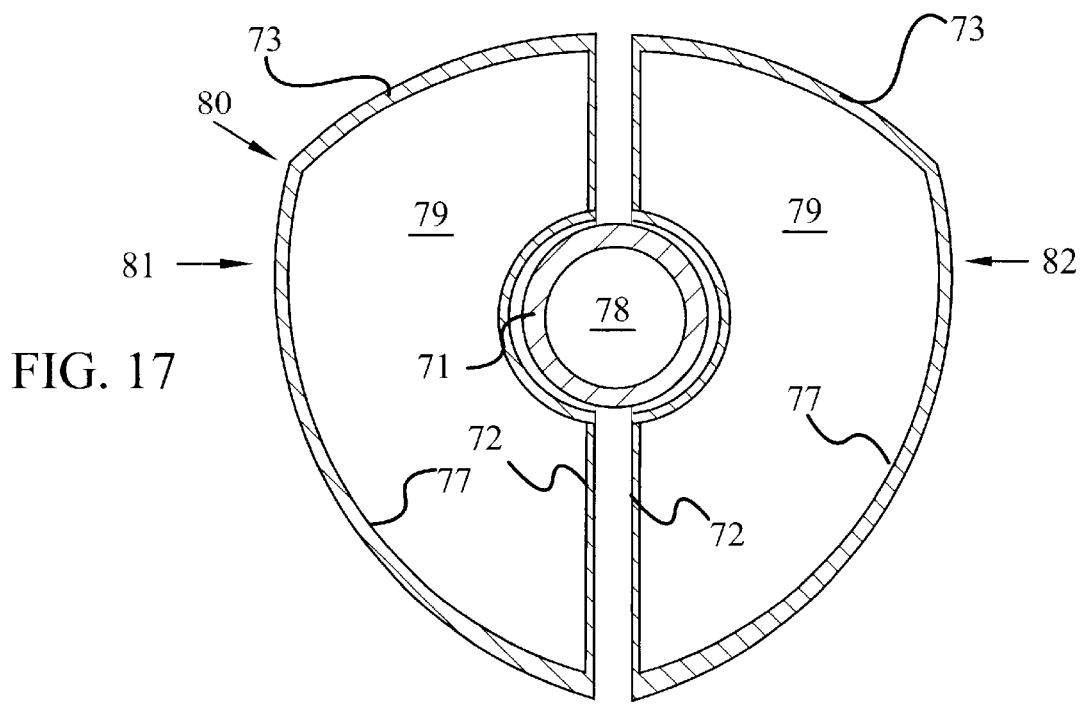
FIG. 17 is a cross-sectional end view similar to the view of FIG. 15, but of a two-part support for the internal conduit according to an embodiment of the present invention.

FIG. 17 illustrates a two-part solar collector pipe 80 having first 81 and second 82 sections which fit around a separate internal conduit 71. As with previous embodiments, the internal conduit 71 may be a standard PVC, copper, aluminum, or other pipe available on the market. By using a conventional metal pipe, there is less chance that the pipe will leak due to repeated thermal stress on the pipe, allowing the pipe to have a longer life. Again, use of conventional pipes as the internal conduit 71, also allows for easy adaptation of the solar collector pipe system to existing plumbing. The absorbing portions 72 of each section 81 and 82 of the solar collector pipe 80 may be sized and shaped to fit snugly around the internal conduit 71 for best heat transfer, though this is not required for the invention. Use of a two-part solar collector pipe 80 may allow some existing plumbing systems to be modified for solar heating without disassembly of the existing system. Alternatively, three or more sections of solar collector pipe may be used if helpful for a particular embodiment.

Figure 18:
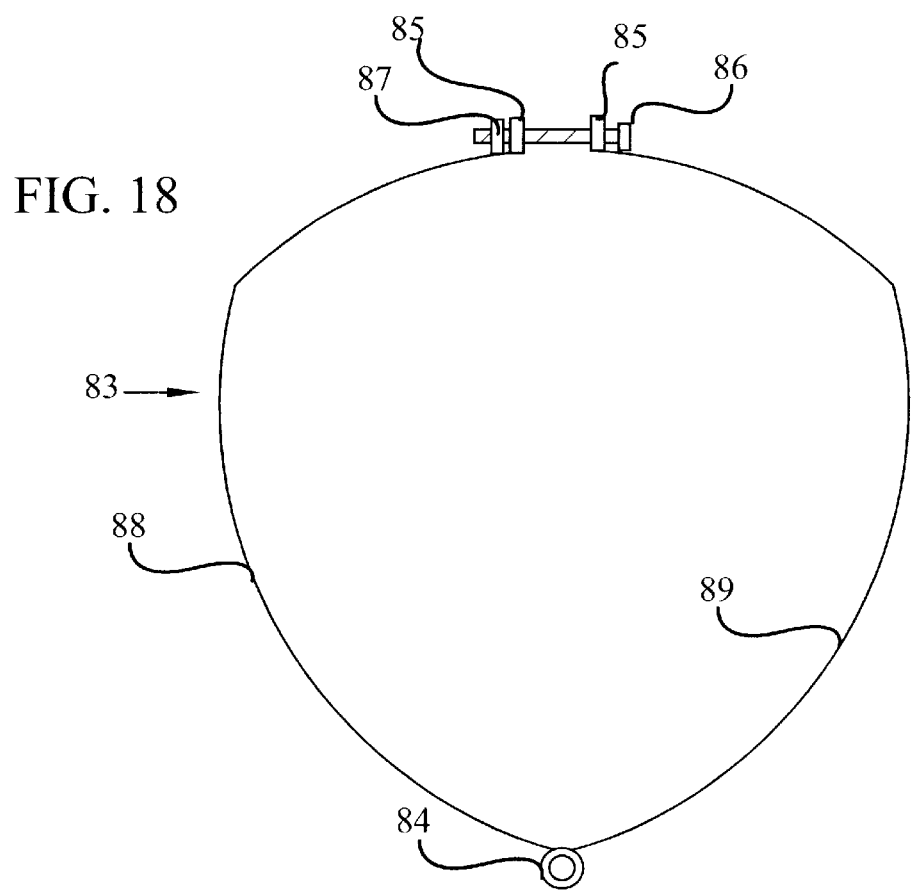
FIG. 18 is an embodiment of a securing clamp for use with a multi-part solar collector pipe such as that illustrated in FIG. 17.

FIG. 18 illustrates a clamp 83 for holding together the two sections 81 and 82 of the solar collector pipe 80 shown in the embodiment of FIG. 17. The clamp 83 may be formed of any material that may be formed or is formable into the desired shape. Examples of formable materials include, without limitation, metals and composites, plastics, rubber, silicon, and the like. In one particular embodiment of the invention, the clamp 83 includes two side portions 88 and 89 joined at the bottom by a hinge 84 and at the top by a bolt 86 and nut 87 coupling together the two sides 88 and 89 of the clamp 83 at connection ports 85. Other clamps, joins and hinges are known in the art and may be substituted for those shown in FIG. 18 by those of ordinary skill in the art. For example, the hinge 84, may alternatively be formed as merely a flexible portion of the clamp 83 which is flexed to allow the clamp 83 to extend around the solar collector pipe 80, and then flexed back into place before it is joined at the top. Additionally, the bolt 86 and nut 87 joint at the top of the clamp may alternatively be replaced by a cotter pin, screw, a locking bracket, or the like in other embodiments of the invention.

Figure 19:
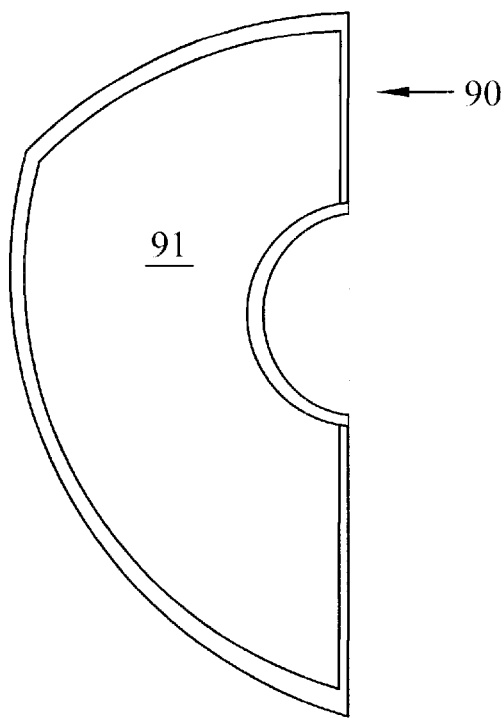
FIG. 19 is a front view of an end cap embodiment of the invention for use with a two-part support for an internal conduit such as that illustrated in FIG. 17.
Figure 20:
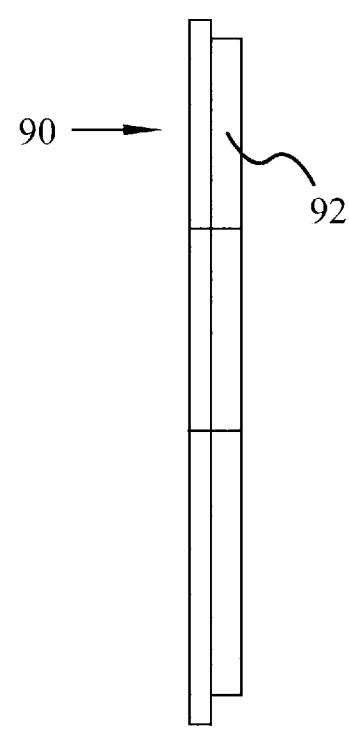
FIG. 20 is a side view of the end cap embodiment of FIG. 19.

A partial end cap 90 for a two-part solar collector pipe 80 (FIG. 17) is illustrated in FIGS. 19 and 20. The partial end cap 90 includes a front surface 91 shaped substantially the same as a cross sectional view of a part of the two-part solar collector pipe 80 with an opening for an internal conduit to extend therethrough. Alternatively, the end cap 90 may be configured to couple to an end of the internal conduit and have a coupling (not shown) extending from the surface of the end cap 90 to couple to another plumbing fixture such as a pipe. The back side of the end cap 90 includes a raised portion 92 sized and shaped to fit snugly into the end of a solar collector pipe section 80. Like previous embodiments of the solar collector pipe, the solar collector pipe of the present embodiment may be evacuated to increase its thermal transfer properties. As will be clear to those of ordinary skill in the art, the front surface 91 of the solar collector pipe may be sized much larger and of a different shape than the cross-section of the solar collector pipe. In a particular example of the invention, the front surface 91 is configured with a squared base to act as a support for the solar collector pipe when coupled thereto. The end caps 90 may be coupled to the solar collector pipe through friction, screws, adhesive, or any other coupling means known in the art.

Figure 21:
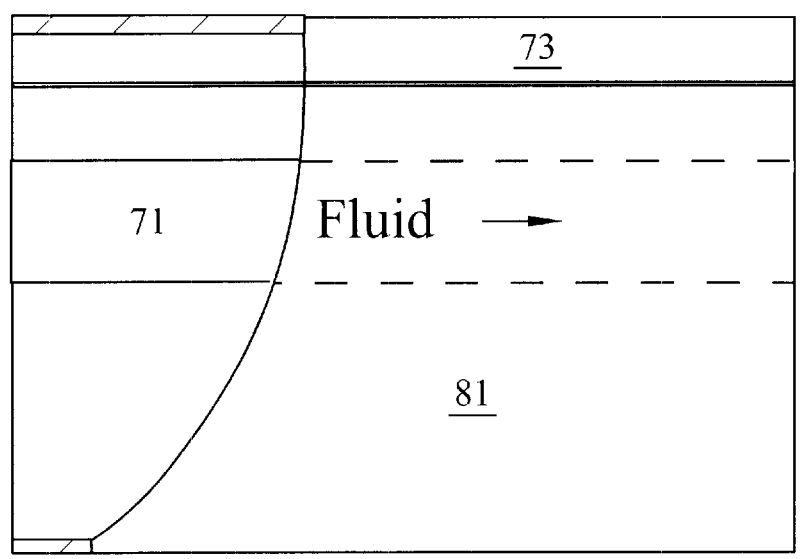
FIG. 21 is a cut-away side view of a solar collector pipe of an embodiment of the invention having an internal conduit, illustrating the flow of fluid through the pipe.
Figure 22:
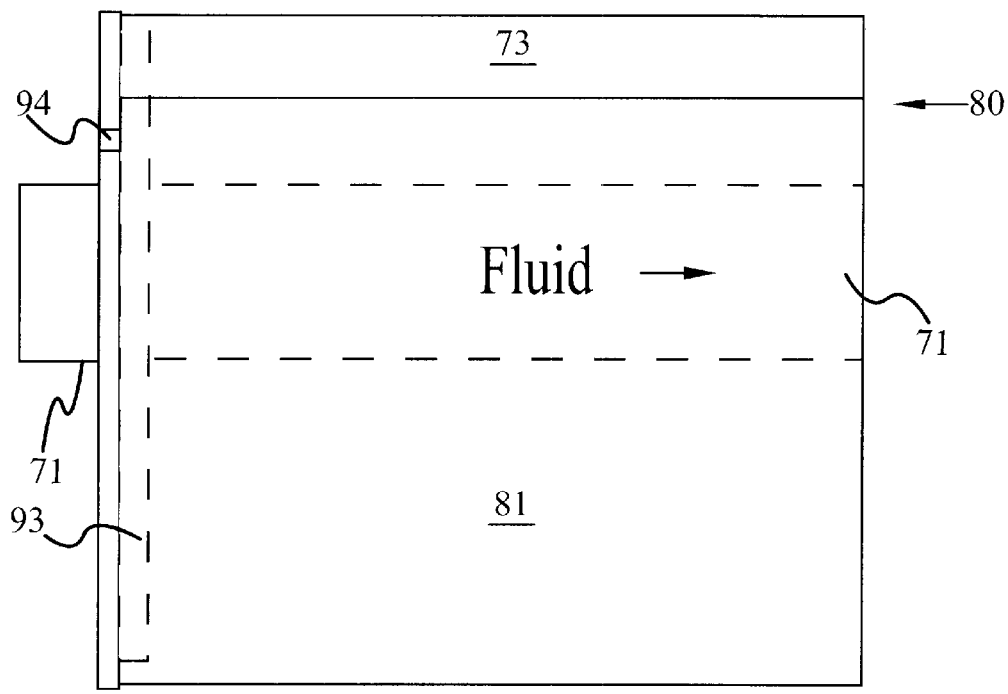
FIG. 22 is a side view of a solar collector pipe of an embodiment of the invention having an internal conduit with an end cap thereon, illustrating the flow of fluid through the pipe.
Figure 23:
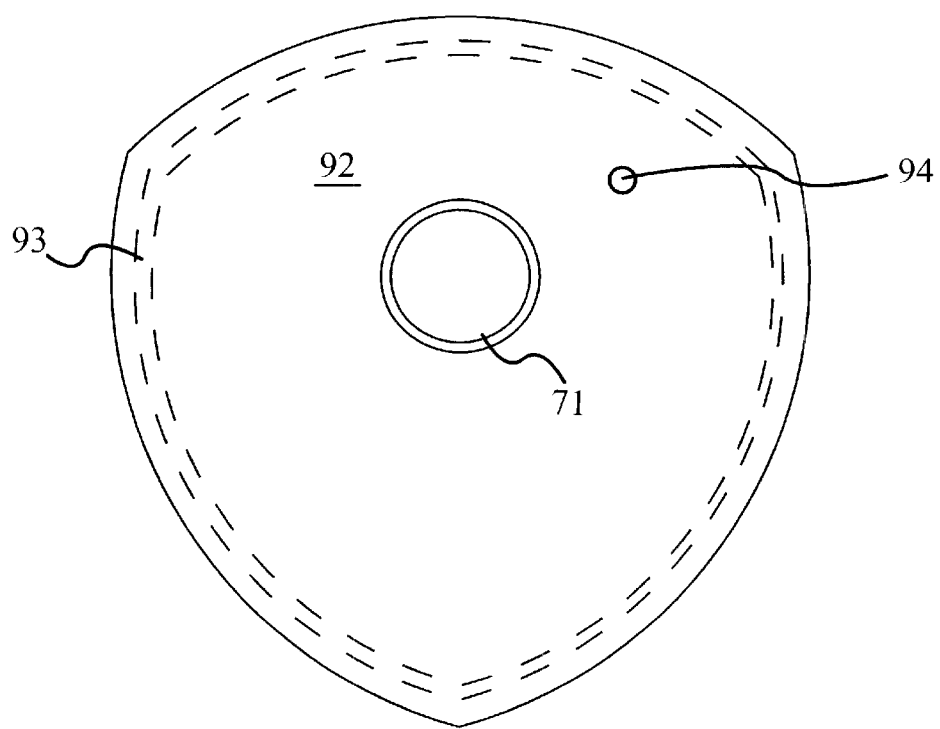
FIG. 23 is a front view of an end cap according to an embodiment of the invention, for use with embodiments of the invention having an internal conduit.

The flow of fluid through the internal conduit 71 is shown in FIG. 21. FIGS. 22 and 23 illustrate views of an embodiment of a solar collector pipe 80 having an internal conduit 71 and an end cap 92. The end cap 92 includes a ridge 93 extending from a back surface thereof which is sized and shaped to fit snugly within and/or over an end of the solar collector pipe 80. The internal conduit 71 extends through the end cap 92 for coupling to adjoining plumbing, other solar collector pipes, or the like. The end cap 92 may also be configured to secure the ends of two or more part solar collector pipes, such as that shown in FIG. 17, by including a groove in the ridge 93 perpendicular to the direction of the ridge and making the groove wide enough for the absorbing portions 72 of each section 81 and 82 (FIG. 17) to fit therein. Appropriate adhesive, welding, screws or other methods known in the art, including mere friction, may be used to keep the end cap 92 in place. An evacuation port 94 is included through the end cap 92 for evacuating the solar collector pipe 80 once an otherwise air-tight seal has been created between the end cap 92, the solar collector pipe 80 and the internal conduit 71. Once the solar collector pipe 80 has been evacuated by an appropriate evacuation pump, the evacuation port 94 may be plugged by an appropriate seal, or otherwise sealed to maintain the vacuum within the solar collector pipe 80.

The solar collector pipe according to embodiments of the invention may additionally be incorporated in a solar energy collection system and embodiments thereof. Although the present invention may be readily adapted to a variety of embodiments of a solar energy collection system, with reference to FIGS. 13–14, solar energy collection system 60 is an example of a solar energy collection system of the invention. Solar energy collection system 60 generally includes at least two solar collector pipes 1 in fluid flow communication with one another for conveying fluid to be heated and for removing heated fluid, although the at least two solar collector pipes may comprise a plurality of solar collector pipes 1. Heated fluid from solar energy collection system 60, such as heated air or hot water, may be then used for conditioning the air in a living space, providing hot water for domestic use over a wide range of ambient conditions, heating other bodies of fluid such as the water in a swimming pool, or the like.

Solar collector pipe 1 has previously been described. Other embodiments of the solar collector pipe described and referenced herein may be substituted by those of ordinary skill in the art for the solar collector pipe 1 used by example and without limitation. As such, the at least two solar collector pipes 1 of solar energy collection system 60 each generally comprise: transparent portion 5 for admitting solar energy therethrough; absorbing portion 10 therein for absorbing solar energy; and conduit portion 15 comprising reflecting surface 16 thereon for reflecting solar energy received through the transparent portion onto the absorbing portion. Transparent portion 5, conduit portion 15, and absorbing portion 10 together define at least one fluid passageway for conveying the fluid.

Notwithstanding the foregoing, in an alternative embodiment of a solar energy collection system of the invention, a plurality of solar collector pipes 1 are joined together in a fixed immovable relationship to each other in a unitary body. The unitary solar energy collection system may be used in any application that solar energy collection system 60 may be used in as previously or hereinafter described. Each solar collector pipe 1 in each unitary body comprises transparent portion 5, absorbing portion 10, and conduit portion 15 similar to the components of solar energy collection system 60 as previously described. For each unitary body, the joined solar collector pipes 1 are comprised of an integrally formed lower member formed of conduit portions 15 and an integrally formed top member formed of cover portions 5.

The top member and lower member defining a unitary body may be manufactured separately and then assembled together, or may be manufactured simultaneously and integrally joined with one another. Manufacture of these components separately or simultaneously may include any of extrusion, injection molding, casting, milling, or the like. If the components are manufactured separately, they may then be sealingly coupled with one another in any manner known in the art, such as with an adhesive or a weld for example, depending on, among other considerations, the particular material forming the components.

Solar energy collection system 60 may further comprise at least one mounting bracket 30, as previously described, for removably mounting the at least two solar collector pipes 1 of solar energy collection system 60 against a structure. As such, at least one mounting bracket 30 may be positioned at one of a 22.5° angle and a 45° angle from a horizontal lower axis of at least one mounting bracket 30 for example. At least one mounting bracket 30 may also be adjustable between a plurality of angles as another example.

Solar energy collection system 60 may still further comprise at least one pipe connector, such as pipe connector embodiments 40, 41, and 43, as well as other pipe connector embodiments, as previously described. Accordingly, the at least one pipe connector may connect at least two solar collector pipes 1 of solar energy collection system 60 together in fluid flow communication (e.g., pipe connectors 40 and 43 of FIG. 13). Moreover, the at least one pipe connector may connect one of at least two solar collector pipes 1 of solar energy collection system 60 together with cylindrical pipe 62 or 64 in fluid flow communication (e.g., pipe connector 41 of FIG. 13).

Solar energy collection system 60 may yet further comprise a heating system coupled thereto in fluid flow communication. The heating system is for utilizing heated fluid from solar energy collection system 60 in order to heat an area, such as a room within a structure, a pool, or the like. Solar energy collection system 60 concerns any known embodiments of heating system installations for utilizing the solar heated fluid generated.

Accordingly, the heating system may include a thermal storage device for storing heated fluid from solar energy collection system 60, such as a hot water heater tank, gas water tank, insulated tank, or the like. The thermal storage device is coupled directly or indirectly with the heating system and solar energy collection system 60 in fluid flow communication. The heating system may also include a pump for circulating fluid through solar energy collection system 60 and the heating system. The pump is coupled with the heating system and solar energy collection system 60 in fluid flow communication, and may be any pump for circulating fluid, such as a pool pump, a heat pump, an in-line purge pump for a radiant floor heating system, a sensor-controlled pump, or the like. The heating system may also include a heat circulation system within the area to be heated coupled with the heating system in fluid flow communication. Such a heat circulation system may be radiant floor heating (or Hydronic) tubes embedded in the flooring of a structure, air ducts, or the like.

For some installations, it is most convenient to store the heated fluid in an insulated tank at ground level, rather than at roof-top level. Therefore it becomes convenient to use a sensor-controlled fluid pump to circulate the heat-exchange fluid appropriately. Many standard, simple circuits exist for comparing the fluid temperatures in the tank and solar energy collection system 60, and causing the pump to act only when it is beneficial for it to do so. Particular advantages of this program are evident for the retrofitting of solar energy collection system 60 to an existing hot water system. Embodiments of the present invention do not require a new hot-water tank, and they permit the use of the existing gas or electric system as backup without extensive modification. The ability of the sensor-controlled pump, combined with solar energy collection system 60, to produce and store hotter water than that available from a conventional flat-plate collector, permits a solar hot-water system to use a smaller hot water storage tank than is normally recommended.

Figure 13:
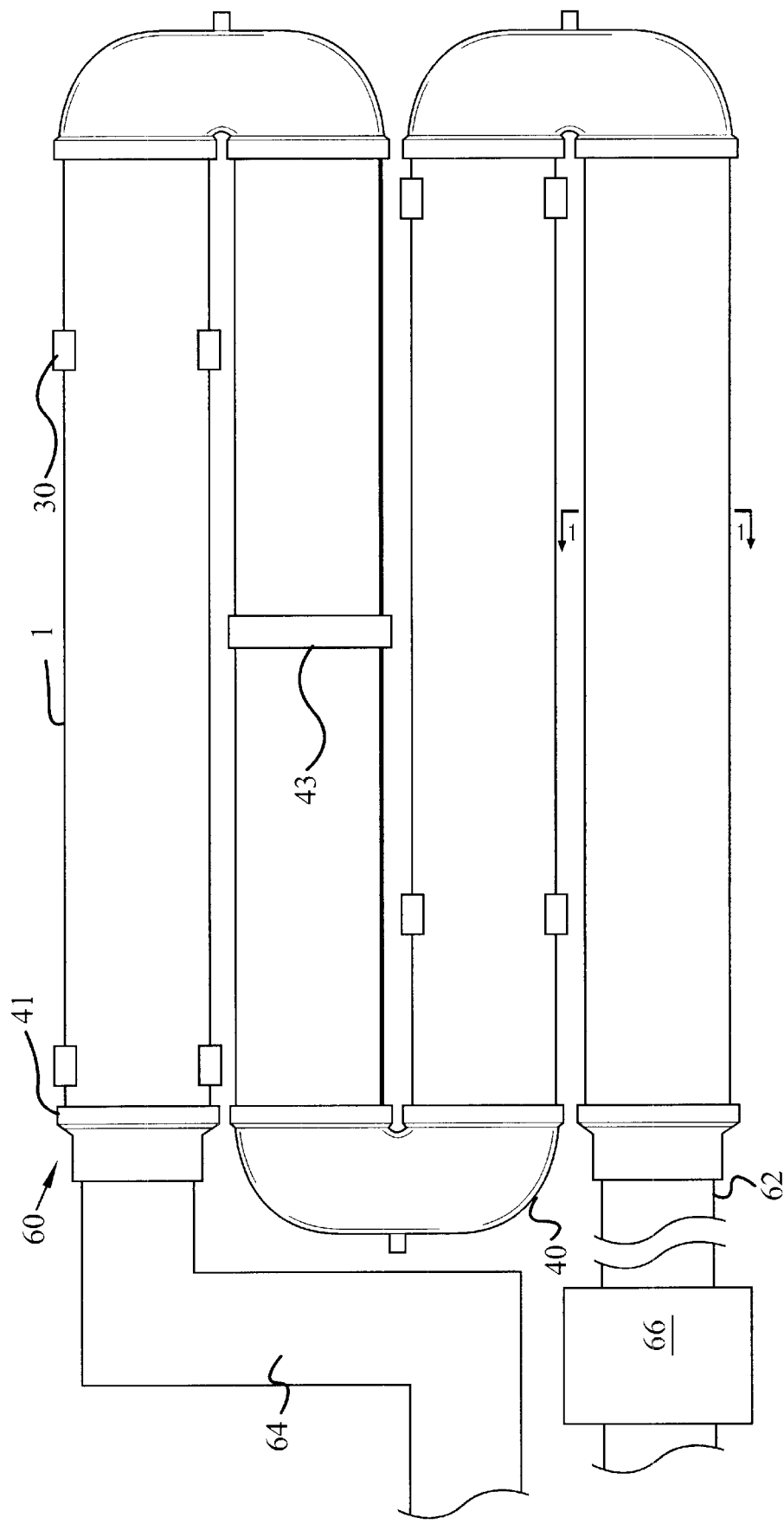
FIG. 13 is a top plan view of a solar energy collection system embodiment of the invention in conjunction with a pump.

In the installation in FIG. 13, solar energy collection system 60 may couple to both inlet pipe 62 and outlet pipe 64, which in turn couple to a heat circulation system, such as a radiant floor heating installation (not shown) for example. Pump 66 is depicted as coupled with inlet pipe 62, but could also be coupled to outlet pipe 64. Pump 66 circulates the fluid (heated water or a food-grade antifreeze mixture) to be heated in solar energy collection system 60 through the embedded tubing, thereby warming the thermal mass of the concrete and heating the area from the floor up.

Still referring to FIG. 13 and as an alternative radiant floor heating installation, heated fluid from solar energy collection system 60 may flow through the embedded tubing via thermosiphon, thereby warming the thermal mass of the concrete and heating the area from the floor up. Thermosiphon is a natural flow of water that results from water being heated and allowed to rise convectively as part of a circulation plan in a closed-loop radiant floor heating system. For example, water heated in solar energy collection system 60 will naturally want to rise, effectively both pushing and pulling at cooler water in a circulation pattern, thereby moving heated water from solar energy collection system 60 to the tubing for use. However, a heating and circulation system designed to use solar-heated water that circulates by thermosiphon is susceptible to blockage by air bubbles. Accordingly, pump 66 may be a small in-line pump used for purging and clearing the blockage. In this embodiment, pump 66 will circulate water through the tubing fast enough to dislodge an air bubble. Typically, purge pump 66 only comes on when the system stagnates, and when circulation is restored, pump 66 shuts off.

Figure 14:
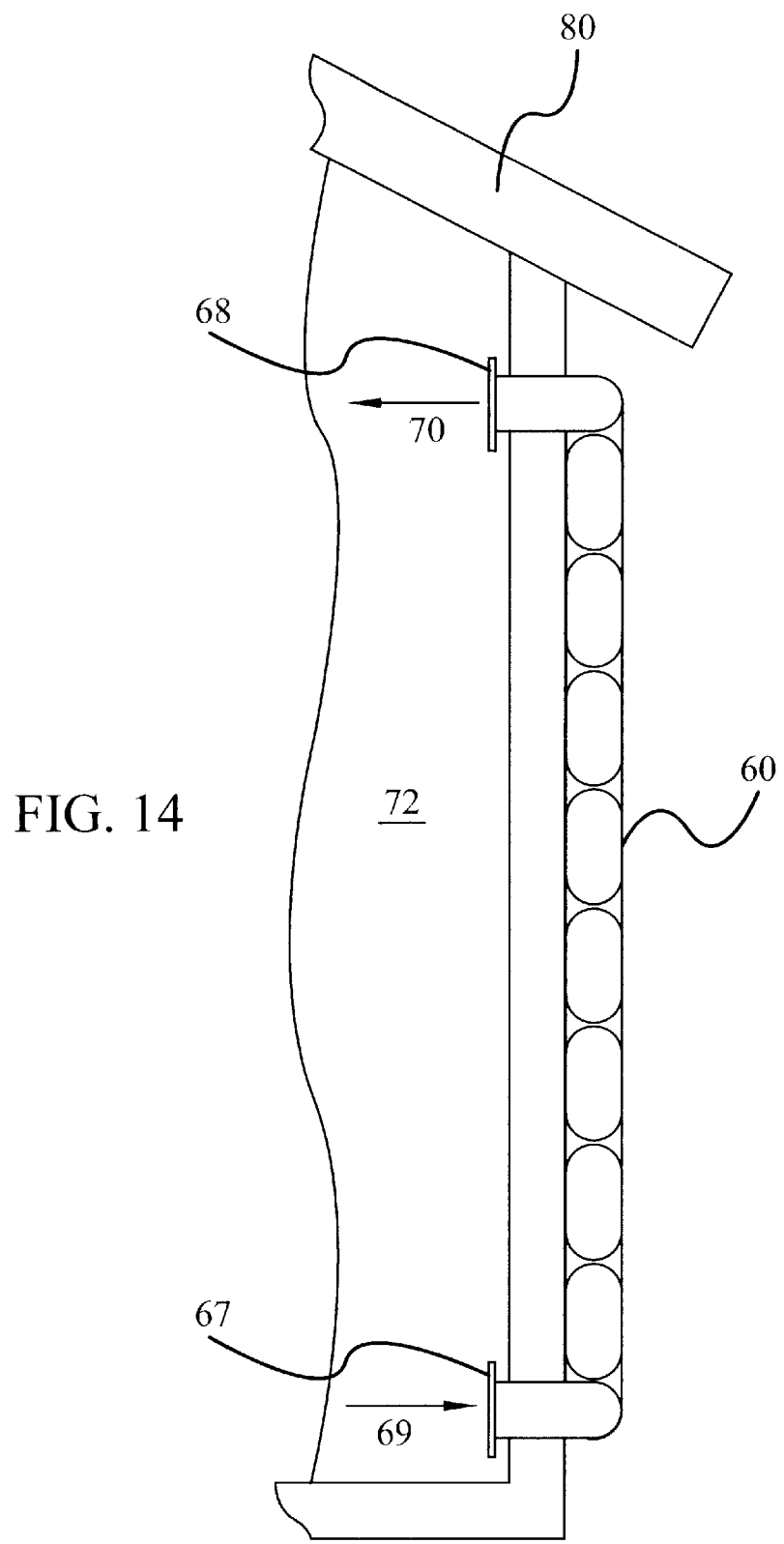
FIG. 14 is a is a side plan view of another solar energy collection system embodiment of the invention mounted on a house in conjunction with a heat circulation system.

Describing the use and installation of solar energy collection system 60 further, reference is made to FIG. 14. In FIG. 14, solar energy collection system 60 is shown in conjunction with a side of house 80. Notwithstanding the foregoing, solar energy collection system 60 may be placed on the roof of house 80, or the roof of any other structure, such as a garage, porch, pool enclosure, and the like to increase the period of time during which solar energy collection system 60 will be exposed to solar energy. Solar energy collection system 60 is coupled to a heating system including inlet air vent 67 and outlet air vent 70. Heated air 70 from solar energy collection system 60 rises convectively and exits through outlet air vent 68. That is, heated air 70 in solar energy collection system 60 will naturally want to rise, effectively both pushing and pulling at cooler air 69 in a circulation pattern through inlet air vent 67, thereby moving heated air 70 from solar energy collection system 60 out into room 72 and conditioning the air therein. Alternatively, a blower, fan, pump, or the like may be incorporated into the heating system to circulate cooler air 69 and heated air 70 through solar energy collection system 60 in a circulation pattern, thereby conditioning the air in room 72.

Accordingly, the solar collector pipe of the invention overcomes the aforementioned drawbacks of previous conventional solar heating systems. The solar collector pipe is easy to manufacture and assemble, is easy to maintain and replace damaged components, and is structured of inexpensive materials. In specific embodiments of the invention, a solar collector pipe system may be assembled even more easily than a conventional sprinkler system for example because it has no sprinkler heads. Moreover, the solar collector pipe directly conveys fluid to be heated and collects and transfers solar energy efficiently and directly to the internal fluid, thereby maximizing both the amount of energy transmitted to the internal fluid and the peak temperature attainable by that fluid. Specifically, by providing a transparent portion and a conduit portion (with a reflecting surface thereon) of the solar collector pipe with certain shapes, such as parabolic shapes, solar energy is appropriately directed to the absorbing portion, especially if it is located along a vertical center axis of the solar collector pipe. Thus, fluid within the solar collector pipe may be heated directly by the solar energy transmitted through the transparent portion, as well as by reflected energy from the reflecting surface of the conduit portion and through heat transfer from the heat absorbing portion.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, unless otherwise specified, any components of the present invention indicated in the drawings or herein are given as an example of possible components and not as a limitation. Similarly, unless otherwise specified, any steps or sequence of steps of the method of the present invention indicated herein are given as examples of possible steps or sequence of steps and not as limitations.

What is claimed is:

1. A solar collector pipe for conveying fluid to be heated and for removing heated fluid, the solar collector pipe comprising:

a first solar collector pipe wall having a transparent portion for admitting solar energy into the solar collector pipe;

at least one absorbing portion internal to the solar collector pipe for absorbing solar energy;

an internal conduit within the solar collector pipe for conveying the fluid; and opposing second and third solar collector pipe walls on either side of a vertical center axis, the second and third walls comprising a reflecting surface thereon for reflecting solar energy received through the transparent portion onto the absorbing portion and the internal conduit;

wherein the opposing solar collector pipe walls together form an ogive shape in cross-section.

2. The solar collector pipe of claim 1, wherein the transparent portion is integrally joined to the conduit portion.

3. The solar collector pipe of claim 1, wherein the transparent portion forms an arc shape in cross-section.

4. The solar collector pipe of claim 1, wherein a lower portion of a first absorbing portion contacts the reflecting surface and an upper portion of a second absorbing portion contacts the transparent portion.

5. The solar collector pipe of claim 1, wherein at least one absorbing portion is integrally joined to the transparent portion and at least one absorbing portion is integrally joined to a solar collector pipe wall.

6. The solar collector pipe of claim 1, wherein at least three absorbing portions contact and support the internal conduit.

7. The solar collector pipe of claim 1, wherein the conduit portion further comprises opposing wall portions on either side of a vertical center axis of the solar collector pipe that comprise:

a locking tab protruding outwardly from a first opposing wall portion; and at least one opposing tab slot defined by a second opposing wall portion, wherein the at least one opposing tab slot is configured to receive the locking tab of a different solar collector pipe in removable engagement.

8. The solar collector pipe of claim 7, wherein the at least one opposing tab slot comprises a plurality of tab slots configured to receive the locking tab of the different solar collector pipe in removable engagement such that the different solar collector pipe may be positioned to account for a plurality of structural angles.

9. The solar collector pipe of claim 1, further comprising an end cap having a conduit opening therethrough, the end cap being sized and shaped to seal an end of the solar collector pipe.

10. The solar collector pipe of claim 9, the end cap further comprising an evacuation port therethrough.

11. The solar collector pipe of claim 1, wherein the solar collector pipe is an evacuated solar collector pipe.

12. A solar collector pipe for conveying fluid to be heated and for removing heated fluid, the solar collector pipe comprising:

at least two sections, each section comprising:

a transparent portion for admitting solar energy into the solar collector pipe section;

a first wall having an absorbing portion for absorbing solar energy within the section and recessed section sized and shaped to fit a portion of a conduit thereagainst;

a second wall comprising a reflecting surface thereon for reflecting solar energy received through the transparent portion onto the absorbing portion;

wherein when the at least two sections are oriented with their respective first walls against each other, a conduit may be enclosed within the recessed portions of the walls to transfer heat energy from the absorbing portions to the conduit.

13. The solar collector pipe of claim 12, wherein the second wall is formed of a heat absorbing material.

14. The solar collector pipe of claim 12, further comprising an end cap having a conduit opening therethrough, the end cap being sized and shaped to seal an end of the solar collector pipe.

15. The solar collector pipe of claim 14, the end cap further comprising an evacuation port therethrough.

16. The solar collector pipe of claim 12, wherein each section of the solar collector pipe is an evacuated solar collector pipe section.

17. The solar collector pipe of claim 12, further comprising a clamp configured to hold the first and second sections together.

18. A solar collector pipe for conveying fluid to be heated and for removing heated fluid, the solar collector pipe comprising:

a transparent portion for admitting solar energy into the solar collector pipe;

at least one heat-absorptive conduit internal to the solar collector pipe for absorbing solar energy and transferring the solar energy to fluid within the conduit;

a first curved wall having a first radius of curvature and comprising a first reflecting surface thereon for reflecting solar energy received through the transparent portion onto the absorbing portion; and a second curved wall having a second radius of curvature and comprising a second reflecting surface thereon for reflecting solar energy received through the transparent portion onto the absorbing portion;

wherein the first radius of curvature is substantially equal to the second radius of curvature and the first and second curved walls intersect to form a bullet shape in cross-section.

19. The solar collector pipe of claim 18, wherein the transparent portion forms an arc shape in cross-section.

20. The solar collector pipe of claim 18, wherein the at least one absorbing portion comprises at least three absorbing portions, a first of which contacts the first curved wall, a second of which contacts the second curved wall, and a third of which contacts the transparent portion.

21. A solar collector pipe for conveying fluid to be heated and for removing heated fluid, the solar collector pipe comprising:

a transparent portion for admitting solar energy into the solar collector pipe;

at least one absorbing conduit internal to the solar collector pipe configured to absorb solar energy and transfer the solar energy to fluid conveyed by the absorbing conduit; and opposing first and second wall portions on either side of a vertical center axis, the first and second wall portions intersecting to form an ogive shape in cross-section and comprising a first and second reflecting surface thereon for reflecting solar energy received through the transparent portion onto the absorbing conduit;

wherein the first and second wall portions further comprise:

a locking tab protruding outwardly from the first opposing wall portion; and at least one opposing tab slot defined by the second opposing wall portion, wherein the at least one opposing tab slot is configured to receive the locking tab of a different solar collector pipe in removable engagement.

22. The solar collector pipe of claim 21, wherein the at least one opposing tab slot comprises a plurality of tab slots configured to receive the locking tab of the different solar collector pipe in removable engagement such that the different solar collector pipe may be positioned to account for a plurality of structural angles.

23. The solar collector pipe of claim 21, wherein the transparent portion is integrally joined to the conduit portion.

24. The solar collector pipe of claim 21, wherein a lower portion of a first absorbing portion contacts the reflecting surface and an upper portion of a second absorbing portion contacts the transparent portion.

25. The solar collector pipe of claim 21, wherein at least one absorbing portion is integrally joined to the transparent portion and at least one absorbing portion is integrally joined to a solar collector pipe wall.

26. The solar collector pipe of claim 21, further comprising an end cap having a conduit opening therethrough, the end cap being sized and shaped to seal an end of the solar collector pipe.

27. The solar collector pipe of claim 26, the end cap further comprising an evacuation port therethrough.

28. The solar collector pipe of claim 21, wherein the solar collector pipe is an evacuated solar collector pipe.

* * * * *